US 11,739,182 B2

(12) United States Patent
Hirose et al.

(10) Patent No.: US 11,739,182 B2
(45) Date of Patent: Aug. 29, 2023

(54) POLYESTER COMPOSITION, POLYESTER FILM, AND MAGNETIC RECORDING MEDIUM

(71) Applicant: TOYOBO FILM SOLUTIONS LIMITED, Tokyo (JP)

(72) Inventors: Amane Hirose, Tokyo (JP); Makoto Handa, Tokyo (JP); Mitsuo Tojo, Tokyo (JP); Tatsuya Ogawa, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 446 days.

(21) Appl. No.: 16/964,120

(22) PCT Filed: Jan. 23, 2019

(86) PCT No.: PCT/JP2019/002140
§ 371 (c)(1),
(2) Date: Jul. 22, 2020

(87) PCT Pub. No.: WO2019/151089
PCT Pub. Date: Aug. 8, 2019

(65) Prior Publication Data
US 2021/0032401 A1 Feb. 4, 2021

(30) Foreign Application Priority Data

Jan. 31, 2018 (JP) .................................. 2018-014769
Jan. 31, 2018 (JP) .................................. 2018-014770
Jan. 31, 2018 (JP) .................................. 2018-014771
Jan. 31, 2018 (JP) .................................. 2018-014772

(51) Int. Cl.
*C08G 63/181* (2006.01)
*G11B 5/73* (2006.01)
*C08J 5/18* (2006.01)
*B32B 27/08* (2006.01)

(52) U.S. Cl.
CPC ............ *C08G 63/181* (2013.01); *B32B 27/08* (2013.01); *C08J 5/18* (2013.01); *G11B 5/73931* (2019.05); *B32B 2250/02* (2013.01); *B32B 2250/244* (2013.01); *B32B 2307/208* (2013.01); *C08J 2367/02* (2013.01)

(58) Field of Classification Search
None
See application file for complete search history.

(56) References Cited

U.S. PATENT DOCUMENTS

| | | | | |
|---|---|---|---|---|
| 3,091,600 | A * | 5/1963 | Caldwell ............. | C08G 63/199 528/307 |
| 5,932,685 | A | 8/1999 | Mori et al. | |
| 8,609,227 | B2 | 12/2013 | Hashimoto et al. | |
| 9,492,987 | B2 * | 11/2016 | Manabe ................ | B29C 51/002 |
| 9,776,383 | B2 * | 10/2017 | Manabe ................ | B32B 7/027 |
| 11,037,592 | B2 * | 6/2021 | Handa ................ | G11B 5/73927 |
| 2009/0123756 | A1 * | 5/2009 | Hashimoto ............. | B32B 21/08 428/480 |
| 2010/0272974 | A1 * | 10/2010 | Hashimoto ............. | B32B 27/36 428/480 |
| 2011/0039127 | A1 * | 2/2011 | Kinoshita ............... | B32B 27/08 428/141 |
| 2012/0301717 | A1 * | 11/2012 | Takahira ................ | C09J 163/00 524/604 |
| 2019/0180781 | A1 * | 6/2019 | Handa .................... | G11B 5/012 |

FOREIGN PATENT DOCUMENTS

| | | | |
|---|---|---|---|
| EP | 1950036 A1 | | 7/2008 |
| JP | H10-077335 A | | 3/1998 |
| JP | 2002-003810 A | | 1/2002 |
| JP | 2004-107587 A | | 4/2004 |
| JP | 2004107449 A | * | 4/2004 |
| JP | 2007-030442 A | | 2/2007 |
| JP | 2011-195692 A | | 10/2011 |
| JP | 2013-023622 A | | 2/2013 |
| JP | 2013-173870 A | | 9/2013 |
| JP | 2013173870 A | * | 9/2013 |
| WO | WO 2002/077062 A1 | | 10/2002 |
| WO | WO 2007/058152 A1 | | 5/2007 |

OTHER PUBLICATIONS

English Language Abstract of JP 2004107449 A (Year: 2004).*
Japanese Patent Office, International Preliminary Report in Patentability in International Patent Application No. PCT/JP2019/002140 (dated Aug. 4, 2020).
Japanese Patent Office, Notice of Reasons for Refusal in Japanese Patent Application No. 2018-192592 (dated Mar. 1, 2022).
European Patent Office, Extended European Search Report in European Patent Application No. 19747587.4 (dated Oct. 18, 2021).
Japanese Patent Office, Notice of Reasons for Refusal in Japanese Patent Application No. 2018-014771 (dated Jun. 8, 2021).
Japanese Patent Office, Notice of Reasons for Refusal in Japanese Patent Application No. 2018-014772 (dated Jun. 8, 2021).
Japan Patent Office, Decision of Refusal in Japanese Patent Application No. 2018-192592 (dated May 31, 2022).

(Continued)

*Primary Examiner* — Kevin M Bernatz
(74) *Attorney, Agent, or Firm* — Leydig, Voit & Mayer, Ltd.

(57) ABSTRACT

An object of the present invention is to more conveniently provide a copolyester for a polyester film which exhibits excellent dimensional stability and in particular excellent dimensional stability against environmental changes in, for example, temperature and humidity, and has a small film elongation percentage at 110° C. A copolyester of the present invention comprises: (A) an aromatic dicarboxylic acid component; (B) an alkylene glycol component; and (C1) a dimer acid component and/or (C2) a dimer diol component, wherein the copolyester contains, with reference to a molar number of a total dicarboxylic acid component, 0.5 to 3.5 mol % of the dimer acid component (C1) and/or 0.3 to 5.0 mol % of the dimer diol component (C2).

19 Claims, No Drawings

(56) References Cited

OTHER PUBLICATIONS

Japanese Patent Office, International Search Report in International Patent Application No. PCT/JP2019/002140 (dated Apr. 2, 2019).
Japan Patent Office, Notice of Reasons for Refusal in Japanese Patent Application No. 2022-141204 (dated Jun. 28, 2023).

* cited by examiner

POLYESTER COMPOSITION, POLYESTER FILM, AND MAGNETIC RECORDING MEDIUM

CROSS-REFERENCE TO RELATED APPLICATIONS

This patent application is the U.S. national phase of International Patent Application No. PCT/JP2019/002140, filed Jan. 23, 2019, which claims the benefit of Japanese Patent Application No. 2018-014769, filed Jan. 31, 2018, Japanese Patent Application No. 2018-014770, filed Jan. 31, 2018, Japanese Patent Application No. 2018-014771, filed Jan. 31, 2018, and Japanese Patent Application No. 2018-014772, which are incorporated by reference in their entireties herein.

TECHNICAL FIELD

The present invention relates to a polyester composition, a polyester film, and a magnetic recording medium using a copolyester obtained by copolymerizing dimer acid and/or dimer diol in a specific amount.

BACKGROUND ART

Aromatic polyesters typified by polyethylene terephthalate and polyethylene-2,6-naphthalene dicarboxylate are widely used in films and the like because they have excellent mechanical characteristics, dimensional stability, and heat resistance. In particular, polyethylene-2,6-naphthalate has more excellent mechanical characteristics, dimensional stability, and heat resistance than those of polyethylene terephthalate, and is used in applications in which these requirements are severe, for example, a base film and the like of a high-density magnetic recording medium and the like.

The requirement for an improvement of the recording density in recent magnetic recording media and the like is severe. Following this, there have been circumstances where the dimensional stability demanded in the base film cannot be achieved in not only the polyethylene terephthalate film but the polyethyoene-2,6-naphthalate film.

Therefore, Patent Document 1 proposes that a 4,4'-(alkylenedioxy)bisbenzoic acid component is copolymerized. Patent Document 2 proposes that dimension stability with respect to change in humidity is improved by copolymerizing a 2,6-naphthalenedicarboxylic acid component (component A) and a terephthalic acid component, an isophthalic acid component or a 1,4-cyclohexanedicarboxylic acid component (component B), an ethylene glycol component (component C) as a glycol component, and an aliphatic dimer diol component (component D).

PRIOR ART DOCUMENTS

Patent Document

Patent Document 1: JP-A-2013-23622
Patent Document 2: JP-A-2013-173870

SUMMARY OF THE INVENTION

Problems to be Solved by the Invention

However, in Patent Document 1, the 4,4'-(alkylenedioxy) bisbenzoic acid component has a very complicated structure, which makes it difficult to obtain a raw material. It was found that the polyester described in Patent Document 2 has a large film elongation percentage at 110° C. in a longitudinal direction, and troughs occur when a magnetic layer or a backcoat layer is applied, resulting in coating unevenness.

Therefore, an object of the present invention is to more conveniently provide a copolyester for a polyester film which exhibits excellent dimensional stability and in particular excellent dimensional stability against environmental changes in, for example, temperature and humidity, and has a small film elongation percentage at 110° C.

Means for Solving the Problems

In a polyester film, both a humidity expansion coefficient and a temperature expansion coefficient have a very close relationship with a Young's modulus. As the Young's modulus is higher, the coefficients are generally lower. However, the Young's modulus cannot be increased indefinitely, and there is voluntary limitation to the Young's modulus from the viewpoint of securing film forming properties and Young's modulus in the orthogonal direction. Therefore, as a result of extensive and intensive investigations on whether a film having a lower expansion coefficient against the Young's modulus can be obtained, the present inventors found that a copolymer polyester using a dimer acid component and/or a dimer diol component in a small amount as a copolymer component surprisingly provides a film having excellent properties, and achieved the present invention.

Thus, the present inventors found that the above problems can be solved by the present invention having the following aspects:

<<Aspect 1>>

A copolyester comprising:
(A) an aromatic dicarboxylic acid component;
(B) an alkylene glycol component; and
(C1) a dimer acid component and/or (C2) a dimer diol component,
wherein the copolyester contains, with reference to a molar number of a total dicarboxylic acid component, 0.5 to 3.5 mol % of the dimer acid component (C1) and/or 0.3 to 5.0 mol % of the dimer diol component (C2).

<<Aspect 2>>

The copolyester according to the aspect 1, wherein the dimer acid component (C1) and/or the dimer diol component (C2) are/is derived from a mixture of an aliphatic dicarboxylic acid component and/or aliphatic diol component having an average carbon number of 20 to 55.

<<Aspect 3>>

The copolyester according to the aspect 1 or 2, comprising the following repeating units (I) to (III):

$$—C(O)—R^A—C(O)—  \quad (I)$$

$$—C(O)—R^B—C(O)— \quad (II)$$

$$—O—R^C—O— \quad (III)$$

wherein the repeating unit (I) is the dimer acid component (C1), and $R^A$ is an alkylene group which has 31 to 51 carbon atoms, and may contain a cyclic ring and/or a branched chain, the repeating unit (II) is the aromatic dicarboxylic acid component (A), and $R^B$ is a phenylene group or a naphthalenediyl group, and the repeating unit (II) is the alkylene glycol component (B), and $R^C$ is an alkylene group having 2 to 6 carbon atoms.

<<Aspect 4>>

The copolyester according to the aspect 1 or 2, wherein the copolyester contains, with reference to a molar number of the aromatic dicarboxylic acid component, 0.3 to 5.0 mol % of the dimer diol component (C2), and the aromatic dicarboxylic acid component (A) is aromatic dicarboxylic acid having 6 or more carbon atoms, the alkylene glycol component (B) is alkylene glycol having 2 to 4 carbon atoms, and the dimer diol component (C2) is aliphatic dimer diol having 31 to 50 carbon atoms.

<<Aspect 5>>

A polyester film containing the copolyester according to any one of the aspects 1 to 4.

<<Aspect 6>>

A laminated polyester film comprising a film layer A which comprises a polyester film, and a film layer B which comprises a polyester film and is laminated over the film layer A, wherein at least one of the film layer A and the film layer B is the polyester film according to the aspect 5.

<<Aspect 7>>

The laminated polyester film according to the aspect 6, wherein a content ($W_{AB}$) of the dimer acid component (C1) is within a range of 0.5 to 3.5 mol %; or a content ($W_{AB}$) of the dimer diol component (C2) is within a range of 0.5 to 5.0 mol %, with reference to a molar number of a total dicarboxylic acid component in a whole of the laminated polyester film.

<<Aspect 8>>

The laminated polyester film according to the aspect 6 or 7, wherein a difference between a content ($W_A$) of the dimer acid with reference to a molar number of a total dicarboxylic acid component in the film layer A and a content ($W_B$) of the dimer acid with reference to a molar number of a total dicarboxylic acid component in the film layer B is 0.3 mol % or more.

<<Aspect 9>>

The laminated polyester film according to the aspect 6 or 7, wherein a difference between a content ($W_A$) of the dimer diol with reference to a molar number of a total dicarboxylic acid component in the film layer A and a content ($W_B$) of the dimer diol with reference to a molar number of a total dicarboxylic acid component in the film layer B is 0.3 mol % or more.

<<Aspect 10>>

The laminated polyester according to any one of the aspects 6 to 9, wherein a difference between surface roughness ($Ra_A$) of the film layer A and surface roughness ($Ra_B$) of the film layer B is 1.0 nm or more.

<<Aspect 11>>

The laminated polyester film according to any one of the aspects 6 to 10, wherein at least one film layer of the film layers A and B contains, with reference to a mass of the film layer, 0.5 to 25% by mass of at least one selected from the group consisting of polyimide, polyetherimide, polyether ketone, polyether ether ketone, and mixtures thereof in addition to the copolyester.

<<Aspect 12>>

The laminated polyester film according to any one of the aspects 6 to 11, wherein the laminated polyester film is used for a base film of a magnetic recording medium.

<<Aspect 13>>

A magnetic recording medium including: the laminated polyester film according to any one of the aspects 6 to 12; and a magnetic layer formed on one surface of the laminated polyester film.

Effect of the Invention

The present invention can more conveniently provide a polyester film which exhibits excellent dimensional stability and in particular excellent dimensional stability against environmental changes in, for example, temperature and humidity, has a small film elongation percentage at 110° C., and is less likely to cause coating unevenness in a coating step. Furthermore, the present invention can provide a polyester film which easily achieves dimensional stability against environmental changes in, for example, temperature and humidity, flatness, and winding properties on high levels.

Therefore, the present invention provides a film which is suitable for applications in which high dimensional stability taking into account influences by the humidity and temperature is required, in particular, a base film of a high-density magnetic recording medium. The use of the film of the present invention can provide a high-density magnetic recording medium having excellent dimensional stability.

MODE FOP CARRYING OUT THE INVENTION

<<Copolyester>>

A copolyester of the present invention contains a dicarboxylic acid component and a glycol component.

Specifically, the copolyester of the present invention contains: (A) an aromatic dicarboxylic acid component; (B) an alkylene glycol component; and (C1) a dimer acid component and/or (C2) a dimer diol component, wherein the copolyester contains, with reference to the molar number of the aromatic dicarboxylic acid or the molar number of the total dicarboxylic acid component, 0.5 to 3.5 mol % of the dimer acid component (C1) and/or 0.3 to 5.0 mol % of the dimer diol component (C2). Both the dimer acid component (C1) and the dimer diol component (C2) may be contained in the copolyester of the present invention as long as they can impart the advantageous effects of the present invention. Only the dimer acid component (C1) may be contained, or only the dimer diol component (C2) may be contained.

The copolyester in the aspect of the present invention containing the dimer acid component (C1) contains, for example, the following repeating units (I) to (III):

$$-C(O)-R^A-C(O)- \quad (I)$$

$$-C(O)-R^B-C(O)- \quad (II)$$

$$-O-R^C-O- \quad (III)$$

wherein the repeating unit (I) is the dimer acid component (C1), and $R^A$ is an alkylene group which has 31 to 51 carbon atoms, and may contain a cyclic ring and/or a branched chain, the repeating unit (II) is the aromatic dicarboxylic acid component (A), and $R^B$ is a phenylene group or a naphthalenediyl group, and the repeating unit (II) is the alkylene glycol component (B), and R is an alkylene group having 2 to 6 carbon atoms.

The copolyester in the aspect of the present invention containing the dimer diol component (C2) contains, for example, with reference to the molar number of the aromatic dicarboxylic acid component or the molar number of the total dicarboxylic acid component, 0.3 to 5.0 mol % of the dimer diol component (C2), and the aromatic dicarboxylic acid component (A) is aromatic dicarboxylic acid having 6 or more carbon atoms; the alkylene glycol component (B) is alkylene glycol having 2 to 4 carbon atoms; and the dimer diol component (C2) is aliphatic dimer diol having 31 to 50 carbon atoms.

<(A) Aromatic Dicarboxylic Acid Component>

The type of the aromatic dicarboxylic acid component (A) used in the copolyester of the present invention is not particularly limited as long as the aromatic dicarboxylic acid component (A) can impart the advantageous effects of the present invention.

For example, examples of the aromatic dicarboxylic acid component include one containing a phenylene group or a naphthalene-diyl group, and include a terephthalic acid component, an isophthalic acid component, a 2,6-naphthalenedicarboxylic acid component, and a 2,7-naphthalenedicarboxylic acid component. Among these, from the viewpoint of the effects of the present invention, preferable are the terephthalic acid component and the 2,6-naphthalenedicarboxylic acid component with which physical properties such as mechanical strength and the like are relatively easily improved, and particularly preferable is the 2,6-naphthalenedicarboxylic acid component.

<(B) Alkylene Glycol Component>

The type of the alkylene glycol component (B) used in the copolyester of the present invention is not particularly limited as long as the alkylene glycol component (B) can impart the advantageous effects of the present invention.

The alkylene glycol component (B) includes an alkylene glycol of an alkylene group having 2 to 6 carbon atoms, particularly 2 to 4 carbon atoms, and examples thereof include an ethylene glycol component, a trimethylene glycol component, and a tetramethylene glycol component. Among these, from the viewpoint of the effects of the present invention, preferable is the ethylene glycol component with which physical properties such as mechanical strength are relatively easily improved.

<(C1) Dimer Acid Component>

The dimer acid is a mixture of known dibasic acids obtained by the intermolecular reaction of an unsaturated fatty acid derived from plant. The industrial production process of the dimer acid is virtually standardized in this industry. For example, the dimer acid is obtained by dimerizing unsaturated fatty acid having 10 to 30 carbon atoms, particularly 11 to 22 carbon atoms, or a lower alcohol ester thereof using a clay catalyst or the like, and removing a by-product such as trimer acid or monomer acid. The dimer acid used in the present invention is preferably aliphatic dicarboxylic acid having an average carbon number of 20 to 55, particularly 31 to 51, and particularly preferably has a branched structure and a cyclohexane ring structure.

In the specific dimer acid component represented by the aforementioned structural formula (I), $R^A$ is an alkylene group having 31 to 51 carbon atoms, and the alkylene group may partially have an alicyclic moiety such as a cyclohexane ring. The alkylene group may have a branched chain as well as a straight chain, and preferable examples thereof include an alkylene group having both a branched chain and a cyclohexane ring structure. Among these, from the viewpoint of the effects of the present invention, more preferable is dimer acid in which $R^A$ is an alkylene group having an alkyl branched chain and cyclohexane ring having 33 to 49 carbon atoms, and particularly preferable is dimer acid in which $R^A$ is an alkylene group having an alkyl branched chain and cyclohexane ring having 35 to 47 carbon atoms.

In such an aspect, the copolyester of the present invention may be copolymerized with a copolymerization component which is known per se, for example, an aliphatic dicarboxylic acid component or an alicyclic dicarboxylic acid component which does not correspond to the aforementioned formula (I), an aromatic dicarboxylic acid component which does not correspond to the aforementioned formula (II), an alkylene glycol component which does not correspond to the aforementioned formula (III), a hydroxycarboxylic acid component, an acid component having three or more functional groups such as trimellitic acid, or an alcohol component or the like as long as the effects of the present invention are not impaired. As a matter of course, with reference to the molar number of a total dicarboxylic acid component constituting the copolyester, the total molar number of the aromatic dicarboxylic acid components represented by the aforementioned formulae (I) and (II) and the molar number of the glycol component represented by the aforementioned formula (III) are preferably 90 mol % or more, and more preferably 95 mol % or more each.

Now, one characteristic feature of the copolyester of the present invention resides in the matter that the dimer acid component, in particular, the specific dimer acid component represented by the formula (I) is copolymerized in an amount of 0.5 mol % or more and 3.5 mol % or less with reference to the molar number of the total dicarboxylic acid component constituting the copolyester. When the proportion of the dimer acid component is less than the lower limit, the effect of reducing the humidity expansion coefficient is hardly exhibited. Meanwhile, when it exceeds the upper limit, the film forming properties are impaired; the mechanical characteristics such as the Young's modulus are hardly improved by stretching; and the temperature expansion coefficient is hardly lowered. In an extreme case, a film is broken in a film forming step such as stretching. Also, surprisingly, the effect of reducing the humidity expansion coefficient by the specific dimer acid component is efficiently exhibited even when its amount is relatively small. From such a viewpoint, the upper limit of the content proportion of the specific dimer acid component is preferably 3.5 mol % or less, more preferably 3.2 mol % or less, and still more preferably 2.9 mol % or less, whereas the lower limit thereof is preferably 0.5 mol % or more, more preferably 0.7 mol % or more, and still more preferably 0.9 mol % or more.

From such a viewpoint, the upper limit of the proportion of the aromatic dicarboxylic acid component represented by the formula (II) is preferably 99.5 mol % or less, more preferably 99.3 mol % or less, and particularly preferably 99.1 mol % or less. The lower limit thereof is preferably 96.5 mol % or more, more preferably 96.8 mol % or more, and still more preferably 97.1 mol % or more.

By forming a copolyester obtained by copolymerizing such a specific amount of the dimer acid component, a molded article having a low temperature expansion coefficient and a low humidity expansion coefficient, such as a film can be produced.

The copolymerization ratio of the specific dimer acid component can be adjusted by adjusting a composition of raw materials so as to reveal a desired copolymerization ratio at a polymerization stage; or preparing a homopolymer using only the specific dimer acid component as an acid component or a polymer in which the copolymerization ratio is large and a non-copolymerized polymer or a polymer in which the copolymerization ratio is small, and melt kneading these materials to achieve transesterification so as to reveal the desired copolymerization ratio.

As the specific dimer acid component, "Priplast 1838", "Pripol 1009", and "Pripol 1004" and the like which are dimer acids manufactured by Croda can be used.

<Dimer Diol>

The dimer diol is a mixture containing, as a main component, diol having about 36 carbon atoms and obtained by hydrogenating the dimer acid in the presence of a catalyst to form a carboxylic acid moiety of the dimer acid as an alcohol. The dimer diol used in the present invention is preferably aliphatic diol having an average carbon number of 20 to 55, particularly 31 to 50, and particularly preferably has a branched structure and a cyclohexane ring structure.

As the specific dimer diol, Pripol 2033 manufactured by Croda and "SOVERMOL 90" manufactured by Cognis, and the like can be used.

One characteristic feature of the present invention resides in the matter that an aliphatic dimer diol component having 31 to 50 carbon atoms is copolymerized. Specific dimer diols preferably contain branched chains and have alicyclic moieties such as a cyclohexane ring structure. Particularly preferable are those having both branched chains and cyclohexane rings. The number of carbon atoms of the dimer diol is preferably 34 to 46.

In such an aspect, the copolyester of the present invention may be copolymerized, in a range which does not impair the effects of the present invention, with a copolymerization component which is known per se, for example, an aliphatic dicarboxylic acid component, an alicyclic dicarboxylic acid component, an alkylene glycol component which does not correspond to any of the aforementioned ones, a hydroxycarboxylic acid component, and an acid component having three or more functional groups such as trimellitic acid, or an alcohol component or the like. From a such viewpoint, when the alkylene glycol component having 2 to 4 carbon atoms is an ethylene glycol component, the proportion of the diethylene glycol component is preferably 0.5 to 3 mol % with reference to the molar number of a total aromatic dicarboxylic acid component or the molar number of the total dicarboxylic acid component from the viewpoints of the film forming properties and the dimensional stability of the obtained product. Particularly preferably, the proportion of the diethylene glycol component is 1.0 to 2.5 mol %.

Now, one characteristic feature of the copolyester of the present invention resides in the matter that the dimer diol component is copolymerized in an amount of 0.3 mol % or more and less than 5.0 mol % with reference to the molar number of the total aromatic dicarboxylic acid component constituting the copolyester, or the molar number of the total dicarboxylic acid component. If the proportion of the dimer diol component is less than the lower limit, the effect of reducing the humidity expansion coefficient and the like is hardly exhibited. Meanwhile, when it exceeds the upper limit, the film forming properties are impaired; the mechanical characteristics such as the Young's modulus are hardly improved by stretching; and the temperature expansion coefficient is hardly lowered. In an extreme case, a film is broken in a film forming step such as stretching. Also, surprisingly, the effect of reducing the humidity expansion coefficient by the specific dimer diol component is efficiently exhibited even when its amount is relatively small. From such a viewpoint, the upper limit of the content proportion of the specific dimer diol component is preferably 5.0 mol % or less, more preferably 4.0 mol % or less, and still more preferably 3.0 mol % or less, whereas the lower limit thereof is preferably 0.3 mol % or more, more preferably 0.5 mol % or more, and still more preferably 0.7 mol % or more.

By using a copolyester obtained by copolymerizing such a specific amount of the specific dimer diol component, a molded article having a low temperature expansion coefficient and a low humidity expansion coefficient, such as a film can be produced.

The copolymerization ratio of the specific dimer diol component can be adjusted by adjusting a composition of raw materials so as to reveal a desired copolymerization ratio at a polymerization stage; or preparing a homopolymer using only the specific dimer diol component as a diol component or a polymer in which the copolymerization ratio is large and a non-copolymerized polymer or a polymer in which the copolymerization ratio is small, and melt kneading these materials to achieve transesterification so as to reveal the desired copolymerization ratio.

<<Method for Producing Copolyester Resin>>

A method for producing a copolyester of the present invention will be described in detail.

When the dimer acid is used, with respect to the copolyester of the present invention, the dimer acid and an alkyl ester derivative thereof are allowed to react with, for example, ethylene glycol to produce a polyester precursor. On that occasion, the reaction can also be carried out together with other aromatic dicarboxylic acid component, for example, 2,6-naphthalene dicarboxylic acid or terephthalic acid or an ester forming derivative thereof.

When the dimer diol is used, the copolyester of the present invention can be obtained by subjecting a polyester precursor to a polycondensation reaction. Specifically, a polyester precursor can be obtained by subjecting: an aromatic dicarboxylic acid component having 6 or more carbon atoms, for example, dimethyl 2,6-naphthalenedicarboxylate; specific dimer diol; and a linear glycol component having 2 to 6 carbon atoms, for example, ethylene glycol to a transesterification reaction to obtain a polyester precursor.

The polyester precursor obtained by using the dimer acid and/or the dimer diol is polymerized in the presence of a polymerization catalyst, whereby the copolyester can be produced. If desired, solid phase polymerization or the like may be applied. From the viewpoint of effects of the present invention, the intrinsic viscosity of the thus obtained aromatic polyester as measured at 35° C. using a p-chlorophenol/1,1,2,2-tetrachloroethane mixed solvent (weight ratio: 40/60) is preferably 0.4 to 1.5 dl/g, more preferably 0.5 to 1.2 dl/g, and particularly preferably 0.55 to 0.8 dl/g.

The reaction on the occasion of producing the polyester precursor is preferably carried out at a temperature ranging from 190° C. to 250° C. at atmospheric pressure or under an increased pressure. When the reaction temperature is lower than 190° C., the sufficient reaction hardly proceeds, whereas when it is higher than 250° C., diethylene glycol as a by-product or the like is easily produced.

In the reaction step of producing the polyester precursor, a known esterification or transesterification reaction catalyst may be used. Examples thereof include manganese acetate, zinc acetate, alkali metal compounds, alkaline earth metal compounds, and titanium compounds. Titanium compounds which when formed into a film, can suppress high surface projections are preferable.

Next, a polycondensation reaction will be described. First, a polycondensation temperature is preferably a melting point of the obtained polymer or higher and 230 to 300° C. or lower, and more preferably a temperature higher than the melting point by 5° C. or higher to a temperature higher than the melting point by 30° C. It is preferable that the polycondensation reaction is carried out under a reduced pressure of 100 Pa or less.

Examples of a polycondensation catalyst include metal compounds containing at least one metal element. The polycondensation catalyst can also be used in the esterification reaction. Examples of the metal element include titanium, germanium, antimony, aluminum, nickel, zinc, tin, cobalt, rhodium, iridium, zirconium, hafnium, lithium, calcium and magnesium. More preferable examples of the metal include titanium, germanium, antimony, aluminum, and tin. The use of a titanium compound is particularly preferable because as described above, when formed into a film, it can suppress high surface projections to be formed due to the influence of the residual metal which is used in the catalyst.

These catalysts may be used singly or in combinations. The amount of the catalyst is preferably 0.001 to 0.1 mol %, and more preferably 0.005 to 0.05 mol %, based on the molar number of the repeating units of the copolyester.

Specific examples of the titanium compound as the esterification catalyst, the transesterification catalyst, and the polycondensation catalyst include tetra-n-propyl titanate, tetraisopropyl titanate, tetra-n-butyl titanate, tetraisobutyl titanate, tetra-tert-butyl titanate, tetracyclohexyl titanate, tetraphenyl titanate, tetrabenzyl titanate, lithium oxalate titanate, potassium oxalate titanium, ammonium oxalate titanate, titanium oxide, an orthoester or condensation orthoester of titanium, a reaction product composed of an orthoester or condensation orthoester of titanium and hydroxycarboxylic acid, a reaction product composed of an orthoester or condensation orthoester of titanium, hydroxycarboxylic acid and a phosphorus compound, and a reaction product composed of an orthoester or condensation orthoester of titanium, a polyhydric alcohol having at least two hydroxyl groups and 2-hydroxycarboxylic acid or a base.

As described above, the copolyester of the present invention may be polymerized so that a copolyester having a desired copolymerization ratio is formed, or two or more kinds of aromatic polyesters having different copolymerization ratios from each other may be prepared, and melt kneaded to prepare a blend so as to reveal a desired copolymerization ratio because the transesterification reaction proceeds at the time of melt kneading.

<Polyester Composition>

The polyester composition of the present invention contains the aforementioned copolyester. The polyester composition of the present invention may be blended with an additive which is known per se, or other resin to form a composition as long as the effects of the present invention are not impaired. Examples of the additive include a stabilizer such as an ultraviolet absorbent, an antioxidant, a plasticizer, a lubricant, a flame retardant, a release agent, a pigment, a nucleating agent, a filler or a glass fiber, a carbon fiber and a lamellar silicate. The additive may be appropriately selected depending upon the requirement of the intended use. Examples of other resin include aliphatic polyester resins, polyamide resins, polycarbonates, an ABS resin, liquid-crystalline resins, polymethylmethacrylate, polyamide elastomers, polyester elastomers, polyetherimides, and polyimides.

Now, the polyester composition of the present invention may be further blended with 0.5 to 25% by weight of other thermoplastic resin in addition to the aforementioned copolyester. By blending the thermoplastic resin, heat resistance such as a glass transition temperature can be improved, whereby an effect of reducing the elongation of a film or the like on the occasion of applying a magnetic layer or the like can be expected. Examples of the thermoplastic resin to be blended include polyimide, polyetherimide, polyetherketone, and polyetheretherketone, and polyetherimide is preferable. When the blend amount is too low, the effect of improving heat resistance is small, and when the blend amount is too high, phase separation occurs. Therefore, the content is generally limited to the range of 0.5 to 25% by weight with reference to the mass of the copolyester. Preferably, the content is 2 to 20% by weight, more preferably 4 to 18% by weight, and still more preferably 5 to 15% by weight. Specific examples of polyetherimides include those disclosed in JP-A-2000-355631 and the like. From the viewpoint of further improving dimensional stability against environmental changes, preferable are polyetherimides described in International Publication No. WO/2008/096612, and having copolymerized therein a 6,6'-(ethylenedioxy)di-2-naphthoic acid component, a 6,6'-(trimethylenedioxy)di-2-naphthoic acid component, and 6,6'-(butylenedioxy)di-2-naphthoic acid component and the like.

<<Polyester Film>>

The polyester film of the present invention is preferably a stretched oriented film because it is easy to increase the Young's modulus and the like to be described below, and particularly preferably a biaxially oriented polyester film oriented in two orthogonal directions. For example, the biaxially oriented polyester film can be prepared by subjecting the aforementioned polyester composition to melt film formation, extruding the film into a sheet form and then stretching in the film formation direction (hereinafter may be referred to as "longitudinal direction", "lengthwise direction", or "MD direction") and the direction orthogonal thereto (hereinafter may be referred to as "width direction", "transverse direction", or "TD direction").

As a matter of course, because the resulting film is a film obtained by melt film forming the aforementioned copolyester, the film has the aforementioned mechanical characteristics and the like. The polyester film of the present invention is not limited to a single layer but may be a laminated film. In that case, it will be understood with ease that the laminated film may be one in which at least one layer thereof is a film layer composed of the aforementioned copolyester of the present invention.

Now, in the polyester film of the present invention, from the viewpoint of exhibiting excellent dimensional stability, it is preferable that a temperature expansion coefficient ($\alpha t$) in at least one direction in the plane direction of the film is 14 ppm/° C. or less. With respect to the temperature expansion coefficient ($\alpha t$) in the width direction of the film, when the temperature expansion coefficient in at least one direction of the film is preferably equal to or less than the upper limit, for example, the direction is made in conformity with the direction of the film where the dimensional stability is most likely required, which makes it possible to exhibit excellent dimensional stability against environmental changes on the obtained film. The lower limit of the temperature expansion coefficient ($\alpha t$) is preferably −10 ppm/° C. or more, more preferably −7 ppm/° C. or more, and particularly preferably −5 ppm/° C. or more; and the upper limit thereof is more preferably 10 ppm/° C. or less, still more preferably 7 ppm/° C. or less, and particularly preferably 5 ppm/° C. or less. For example, when formed into a magnetic recording tape, in view of the fact that excellent dimensional stability against dimensional changes due to ambient temperature and humidity changes can be exhibited, the direction where the temperature expansion coefficient is satisfied is preferably the width direction of the polyester film.

In the polyester film of the present invention, the Young's modulus of the film in at least one direction of the film plane direction, and preferably in the direction where the temperature expansion coefficient is 14 ppm/° C. or less is preferably at least 4.5 GPa or more. Though the upper limit thereof is not particularly limited, in general, it is preferably about 12 GPa. The range of the Young's modulus is more preferably 5 to 11 GPa, and particularly preferably 6 to 10 GPa. When the Young's modulus falls outside the range, there may be the case where it is difficult to attain the aforementioned αt and αh, or the mechanical characteristics are insufficient. Such a Young's modulus can be adjusted by the aforementioned blend or copolymerization composition and stretching as described later. In the polyester film of the present invention, for example, when used in a base film of a magnetic tape, the humidity expansion coefficient in at least one direction of the film plane direction, and preferably in the direction where the temperature expansion coefficient is 14 ppm/° C. or less is preferably 1 to 8.5 (ppm/% RH), more preferably 3 to 8.5 (ppm/% RH), and particularly preferably 4 to 7 (ppm/% RH). Though the lower limit thereof is not particularly limited, in general, it is preferably about 1 (ppm/% RH). When the humidity expansion coefficient falls outside the range, the dimensional changes against humidity changes become large. Such a humidity expansion coefficient can be adjusted by the use of the aforementioned polyester composition and orientation due to stretching as described later.

The direction where the temperature expansion coefficient is 14 ppm/° C. or less may be at least one direction, and preferably one where the width direction is satisfied as described above. As a matter of course, in view of the dimensional stability, it is preferable that the direction orthogonal to the width direction similarly satisfies not only the temperature expansion coefficient and the humidity expansion coefficient but also the Young's modulus and the like.

Now, the surface energy of the surface of the polyester composition when formed into a film varies depending on the content of the dimer acid and/or dimer diol. Specifically, as the content of the dimer acid and/or dimer diol increases, the contact angle of water increases. By causing the surface of the film to be more hydrophobic, the humidity expansion coefficient can be lowered, so that the polyester film of the present invention has at least one surface having a contact angle of water of preferably 75 degrees or more, and more preferably 77 degrees or more. The contact angle of water is still more preferably 78 degrees or more. The upper limit of the contact angle is preferably 90 degrees or less from the viewpoint of a coating step. This is because, if the surface energy is too different from that of polyester film, a problem which has not conventionally occurred in the coating step may occur. The upper limit thereof is more preferably 88 degrees or less, and still more preferably 86 degrees or less.

Now, when a magnetic layer or a backcoat layer or the like is applied to the polyester film, heating is carried out in an oven for drying. As one index of the step appropriate ability in the drying step, a film elongation percentage at 110° C. to be described later can be considered. When the film elongation percentage is high, troughs occur in the step, which cause coating unevenness. Therefore, the film elongation percentage is preferably lower. The film elongation percentage is preferably 3.0V or less. The film elongation percentage is preferably 2.5 or less, more preferably 2.0% or less, and still more preferably 1.5% or less.

<Method for Producing Polyester Film>

As described above, the polyester film of the present invention is preferably an oriented polyester film, and particularly preferably a film stretched in the film forming direction and the width direction to increase molecular orientation in the respective directions. It is preferable that the oriented polyester film is produced by, for example, the following method because it is easy to increase the Young's modulus and to reduce the temperature expansion coefficient and the humidity expansion coefficient while keeping the film forming properties.

First, the aforementioned copolyester or polyester composition of the present invention used as a raw material is dried. Then, this was supplied to an extruder heated at a temperature of the melting point (Tm: ° C.) of the aromatic polyester to (Tm+50)° C., and extruded into a sheet form from a die such as a T die. The extruded sheet product is quenched for solidification by a rotating cooling drum or the like to form an unstretched film. Furthermore, the unstretched film is subjected to biaxial stretching.

In order to achieve αt, αh, and Young's modulus and the like as specified in the present invention, it is necessary to facilitate subsequent stretching. In the polyester composition of the present invention, there is a tendency that its crystallization rate is fast, and from such a viewpoint, it is preferable to carry out cooling by the cooling drum very quickly. From such a viewpoint, it is preferable to carry out cooling at a low temperature of 20 to 60° C. When cooling is carried out at such a low temperature, the crystallization in a state of the unstretched film is suppressed, which make it possible to carry out subsequent stretching more smoothly.

For biaxial stretching, a method which is known per se can be adopted, and the biaxial stretching may be either sequential biaxial stretching or simultaneous biaxial stretching.

Here, a producing method of sequential biaxial stretching in which longitudinal stretching, lateral stretching, and a heat treatment are carried out in this order will be described as an example. First, first longitudinal stretching is carried out to an extent of 3 to 8 times at a temperature of a glass transition temperature (Tg: ° C.) of the copolyester to (Tg+40)° C.; stretching in the transverse direction is then carried out to an extent of 3 to 8 times at a temperature higher than that of the preceding longitudinal stretching and ranging from (Tg+10) to (Tg+50)° C.; and as the heat treatment, a heat set treatment is carried out at a temperature equal to or lower than a melting point of the copolyester and ranging (Tg+50) to (Tg+150)° C. for 1 to 20 seconds, and preferably 1 to 15 seconds.

While the sequential biaxial stretching has been described above, the polyester film of the present invention can also be produced by simultaneous biaxial stretching in which longitudinal stretching and lateral stretching are carried out at the same time. For example, the simultaneous biaxial stretching may be carried out by reference to the previously described stretching ratio and stretching temperature and the like.

The polyester film of the present invention is not limited to a single layer film but it may be a laminated film. In the case of the laminated film, two or more molten polyesters are laminated in the die and thereafter extruded into a film form, where preferably polyesters are extruded respectively at a temperature between the melting point (Tm: ° C.) and (Tm+70)° C., or two or more molten polyesters are extruded from the die and thereafter laminated, the sheet product is solidified by rapid cooling into a laminated unstretched film, and biaxial stretching and a heat treatment may be subsequently carried out by methods similar to those in the case of the aforementioned single layer film. When the aforementioned coating layer is provided, it is preferable that a desired coating solution is applied on one surface or both surfaces of the unstretched film or the uniaxially stretched film, and biaxial stretching and a heat treatment are subsequently carried out by a method similar to those in the case of the aforementioned single layer film.

According to the present invention, by using the polyester film of the present invention as a base film, forming a nonmagnetic layer and a magnetic layer in this order on one surface thereof, and forming a backcoat layer on the other surface, or other means, a magnetic recording tape for data storage or the like can be provided.

Now, the polyester film of the present invention is, as described above, not limited to a single layer film, but it may be a laminated film, thereby making it easy to achieve both flatness and windability. For example, by applying a magnetic layer on a flat surface having small surface roughness and a backcoat layer on a rough surface having large surface roughness, both the required flatness and conveyability can be achieved on high levels. From such a viewpoint, when the polyester film is used for the base film of the magnetic recording medium, the upper limit of the surface roughness of the rough surface having large surface roughness is preferably 8.0 nm, more preferably 7.0 nm, and particularly preferably 6.0 nm, whereas the lower limit thereof is preferably 2.0 nm, more preferably 3.0 nm, and particularly preferably 4.0 nm. The upper limit of the surface roughness of the flat surface having small surface roughness is preferably 5.0 nm, more preferably 4.5 nm, and particularly preferably 4.0 nm, whereas the lower limit thereof is preferably 1.0 nm, more preferably 1.5 nm, and particularly preferably 2.0 nm. Such surface roughness can be adjusted by incorporating inert particles and adjusting the particle diameter and content of the inert particles, or by providing a coating layer on the surface.

<<Laminated Polyester Film>>

Hereinafter, the case where the polyester film of the present invention is a laminated polyester film will be described.

When the polyester film of the present invention is a laminated polyester film comprising a film layer A and a film layer B which is laminated over the film layer A, at least one of the film layers A and B may be composed of the aforementioned polyester composition, and other film layer may be composed of other polyester. At this time, from the viewpoint of suppressing the curl of the film, the content the dimer acid and/or dimer diol contained in the film layer A may be substantially the same as that contained in the film layer B. From such a viewpoint, the film layer A and the film layer B may be composed of the same polyester, and the difference between the contents of the dimer acids and/or dimer diols contained in the film layer A and the film layer B may be, for example, less than 0.3 mol %.

Specific preferable examples of polyesters other than the aforementioned copolyesters include polyalkylene terephthalates containing an alkylene terephthalate as a repeating unit, such as polyethylene terephthalate, polytrimethylene terephthalate, and polybutylene terephthalate; and polyalkylene-2,6-naphthalates containing an alkylene-2,6-naphthalate as a repeating unit, such as polyethylene-2,6-naphthalene dicarboxylate, polytrimethylene-2,6-naphthalate, and polybutylene-2,6-naphthalate. Among these, from the viewpoint of mechanical characteristics and the like, polyethylene terephthalate and polyethylene-2,6-naphthalene dicarboxylate are preferable, and polyethylene-2,6-naphthalene dicarboxylate is particularly preferable.

For example, in the laminated polyester film of the present invention, the contents of the dimer acids and/or dimer diols in the film layer A and the film layer B may be different from each other, the difference between the contents being 0.3 mol % or more.

A polyester film which is used in the laminated polyester film of the present invention, and is obtained without copolymerize dimer acid and/or dimer diol can be produced by a method which is known per se. For example, if the dimer acid and/or dimer diol is not added as a raw material, the polyester film can be produced by the aforementioned method.

<<Laminated Polyester Film—Case where Layers have Different Dimer Acid Contents>>

With respect to the laminated polyester film of the present invention, at least one of the film layers A and B is the above polyester film which contains the dimer acid in case that the content of the dimer acid in the film layer A is different from that in the film layer B.

In this case, preferably, the laminated polyester film of the present invention and a magnetic recording medium using the same include may be a laminated polyester film comprising the film layer A and the film layer B comprising polyester containing an aromatic dicarboxylic acid component and alkylene glycol having 2 to 6 carbon atoms as a main resin component, wherein the film layer B is laminated over the film layer A.

Here, at least the polyester forming the film layer B may be obtained by copolymerizing aliphatic dimer acid having 31 to 51 carbon atoms. A content ($W_{AB}$) of the aliphatic dimer acid in a whole of the laminated polyester film with reference to the molar number of the total dicarboxylic acid component may be 0.5 to 3.5 mol %; a difference between a content ($W_B$) of the aliphatic dimer acid in the film layer B and a content ($W_A$) of the aliphatic dimer acid in the film layer A may be 0.3 mol % or more; and a content ($W_B$) of the aliphatic dimer acid in the film layer B may be preferably more than a content ($W_A$) of the aliphatic dimer acid in the film layer A by 0.3 mol % or more.

The laminated polyester film may be obtained by copolymerizing an aliphatic dimer acid component having 31 to 51 carbon atoms with the polyester forming at least one of the film layer A and the film layer B. Specifically, the dimer acid preferably contains a branched chain, preferably has an alicyclic moiety such as a cyclohexane ring structure, and particularly preferably has both a branched chain and a cyclohexane ring. Preferable dimer acids have 34 to 46 carbon atoms. The polyester forming one film layer may be obtained without copolymerizing an aliphatic dimer acid component having 31 to 51 carbon atoms if the relationship of $W_{AB}$ and $W_B-W_A$ or $|W_B-W_A|$ to be described later is satisfied, or may be obtained by copolymerizing the aliphatic dimer acid component.

Now, one of the characteristic features of the laminated polyester film resides in the matter that, with reference to the molar number of the total dicarboxylic acid component, the content ($W_{AB}$) of the aliphatic dimer acid in a whole of the laminated polyester film is 0.5 to 3.5 mol %.

When the content ($W_{AB}$) of the aliphatic dimer acid in the whole of the laminated polyester film is equal to or greater than the lower limit, an effect of reducing the humidity expansion coefficient is exhibited. Meanwhile, when it exceeds the upper limit, the film forming properties are impaired; the mechanical characteristics such as the Young's modulus are hardly improved by stretching; and the temperature expansion coefficient is hardly lowered. In an extreme case, a film is broken in a film forming step such as stretching. The effect of reducing the humidity expansion coefficient by the dimer acid component of the present invention is efficiently exhibited even with a relatively small amount, which is a surprising effect. From such a viewpoint, the upper limit of the content ($W_{AB}$) of the dimer acid component is preferably 3.5 mol %, more preferably 3.2 mol %, and still more preferably 2.9 mol %, whereas the lower limit thereof is preferably 0.5 mol %, more preferably 0.7 mol %, and still more preferably 0.9 mol %. From such a viewpoint, the upper limit of the proportion of the aromatic dicarboxylic acid component is preferably 99.5 mol %, more preferably 99.3 mol %, and particularly preferably 99.1 mol %. The lower limit thereof is preferably 96.5 mol %, more preferably 96.8 mol %, and still more preferably 97.1 mol %.

Another characteristic feature of the laminated polyester film resides in the matter that a difference between the content ($W_B$) of the aliphatic dimer acid in the film layer B and the content ($W_A$) of the aliphatic dimer acid in the film layer A is 0.3 mol % or more. By providing the difference between the content ($W_A$) of the film layer A and the content ($W_B$) of the film layer B, the effect of reducing the humidity expansion coefficient, the film forming properties, and the Young's modulus and the like can be maintained on high levels.

The lower limit of a preferable difference between the contents ($W_B$-$W_A$) in the present invention, and preferably the lower limit of the absolute value (|$W_B$-$W_A$|) of the difference between the contents is 0.4 mol % or more, and more preferably 0.5 mol % or more. Meanwhile, the upper limit of the difference is not particularly limited, but it is preferably 7.0 mol % or less, and more preferably 6.0 mol % or less because the film forming properties of the film layer B are not excessively reduced.

By using such a specific amount of the dimer acid component in the laminated polyester film, a molded product having both a low temperature expansion coefficient and a low humidity expansion coefficient, such as a film can be produced.

The copolymerization ratio of the dimer acid component can be adjusted by adjusting a composition of raw materials so as to reveal the desired copolymerization ratio at a polymerization stage; or preparing a homopolymer using only the dimer acid component as an acid component or a polymer in which the copolymerization ratio is large and a non-copolymerized polymer or a polymer in which the copolymerization ratio is small, and melt kneading these materials to achieve transesterification so as to reveal the desired copolymerization ratio.

The polyester of the present invention may be copolymerized with a copolymerization component which is known per se, for example, an aliphatic dicarboxylic acid component, an alicyclic dicarboxylic acid component, an alkylene glycol component which does not correspond to any of the aforementioned ones, a hydroxycarboxylic acid component and an acid component having three or more functional groups such as trimellitic acid, or an alcohol component or the like as long as the effects of the present invention are not impaired.

<<Laminated Polyester Film—Case where Layers have Different Dimer Diol Contents>>

With respect to the laminated polyester film of the present invention, at least one of the film layers A and B is the above polyester film which contains the dimer diol in case that the content of the dimer diol in the film layer A is different from that in the film layer B.

The laminated polyester film of the present invention and a magnetic recording medium using the same may be a laminated polyester film comprising a film layer A and a film layer B comprising polyester containing an aromatic dicarboxylic acid component and alkylene glycol having 2 to 6 carbon atoms as a main resin component, wherein the film layer B is laminated over the film layer A.

Here, at least the polyester forming the film layer B may be obtained by copolymerizing dimer diol having 31 to 51 carbon atoms; a content ($W_{AB}$) of the dimer diol in a whole of the laminated polyester film with reference to the molar number of the total dicarboxylic acid component may be 0.5 to 5.0 mol %; a difference between a content ($W_B$) of the dimer diol in the film layer B and a content ($W_A$) of the dimer diol in the film layer A may be 0.3 mol % or more; and a content ($W_B$) of the dimer diol in the film layer B may be preferably more than a content ($W_A$) of the dimer diol in the film layer A by 0.3 mol % or more.

A characteristic feature of the laminated polyester film resides in the matter that a polyester forming at least one of the film layer A and the film layer B is copolymerized with a dimer diol component having 31 to 50 carbon atoms. Specific dimer diols preferably contain branched chains and have alicyclic moieties such as a cyclohexane ring structure. Particularly preferable are those having both branched chains and cyclohexane rings. The number of carbon atoms of the dimer diol is preferably 34 to 46. The polyester forming one film layer may be obtained without copolymerizing an aliphatic dimer diol component having 31 to 51 carbon atoms if the relationship of $W_{AB}$ and $W_B$-$W_A$ or |$W_B$-$W_A$| to be described later is satisfied, or may be obtained by copolymerizing the aliphatic dimer component.

Now, one of the characteristic features of the laminated polyester film resides in the matter that, with reference to the molar number of the total dicarboxylic acid component, the content ($W_{AB}$) of the dimer diol in a whole of the laminated polyester film is 0.5 to 5.0 mol %.

When the content ($W_{AB}$) of the dimer diol in a whole of the laminated polyester film is equal to or more than the lower limit, the effect of reducing the humidity expansion coefficient is exhibited. Meanwhile, when it exceeds the upper limit, the film forming properties are impaired; the mechanical characteristics such as the Young's modulus are hardly improved by stretching; and the temperature expansion coefficient is hardly lowered. In an extreme case, a film is broken in a film forming step such as stretching. The effect of reducing the humidity expansion coefficient by the dimer diol component of the present invention is efficiently exhibited even with a relatively small amount, which is a surprising effect. From such a viewpoint, the upper limit of the content ($W_{AB}$) of the dimer diol component is preferably 5.0 mol % or less, more preferably 4.0 mol % or less, and still more preferably 3.0 mol % or less, whereas the lower limit thereof is preferably 0.3 mol % or more, more preferably 0.7 mol % or more, and still more preferably 1.0 mol % or more.

Another characteristic feature of the laminated polyester film resides in the matter that a difference between the content ($W_B$) of the dimer diol in the film layer B and the content ($W_A$) of the dimer diol in the film layer A is 0.3 mol % or more. By providing the difference between the content ($W_A$) of the film layer A and the content ($W_B$) of the film layer B, the effect of reducing the humidity expansion coefficient, the film forming properties, and the Young's modulus and the like can be maintained on high levels.

The lower limit of a preferable difference ($W_B$-$W_A$) between the contents in the present invention, and preferably the absolute value (|$W_B$-$W_A$|) of the difference between the contents is 0.5 mol %, and more preferably 0.7 mol %. Meanwhile, the difference between the contents is not particularly limited, but it is preferably 8.0 mol %, more preferably 7.0 mol %, and particularly preferably 6.0 mol % because the film forming properties of the film layer B are not excessively reduced.

By using such a specific amount of the dimer diol component in the laminated polyester film of the present invention, a molded product having both a low temperature expansion coefficient and a low humidity expansion coefficient, such as a film can be produced.

The copolymerization ratio of the dimer diol component can be adjusted by adjusting a composition of raw materials so as to reveal a desired copolymerization ratio at a polymerization stage; or preparing a homopolymer using only the dimer diol component as a diol component or a polymer in which the copolymerization ratio is large and a non-copolymerized polymer or a polymer in which the copolymerization ratio is small, and melt kneading these materials to achieve transesterification so as to reveal the desired copolymerization ratio.

The polyester of the present invention may be copolymerized with a copolymerization component which is known per se, for example, an aliphatic dicarboxylic acid component, an alicyclic dicarboxylic acid component, an alkylene glycol component which does not correspond to any of the aforementioned ones, a hydroxycarboxylic acid component and an acid component having three or more functional groups such as trimellitic acid, or an alcohol component or the like as long as the effects of the present invention are not impaired.

<<Laminated Polyester Film—Common Characteristic Feature when Layers have Different Dimer Acid and/or Dimer Diol Contents>>

The laminated polyester film of the present invention is preferably a stretched oriented film because it is easy to increase the Young's modulus and the like to be described below, and particularly preferably a biaxially oriented polyester film oriented in two orthogonal directions. For example, the biaxially oriented polyester film can be prepared by subjecting the aforementioned polyester composition to melt film formation, extruding the film into a sheet form and then stretching in the film formation direction (hereinafter may be referred to as "longitudinal direction", "lengthwise direction", or "MD direction") and the direction orthogonal thereto (hereinafter may be referred to as "width direction", "transverse direction", or "TD direction").

As a matter of course, because the resulting film is a laminated polyester film containing a specific amount of the aforementioned dimer acid and/or dimer diol, the film also has excellent mechanical characteristics and the like of the aromatic polyester composed of the dimer acid and/or dimer diol component and the aforementioned dicarboxylic acid component and linear glycol component.

When the laminated polyester film of the present invention is used as a base film for magnetic recording, the thickness of the laminated polyester film is preferably small in order to increase the winding length of a cartridge. From such a viewpoint, the upper limit of the thickness of the laminated polyester film of the present invention is preferably 5 µm, more preferably 4.8 µm, and particularly preferably 4.6 µm. Meanwhile, the lower limit thereof is not particularly limited, but it is preferably 3.2 µm, more preferably 3.4 µm, and particularly preferably 3.6 µm.

Now, in the laminated polyester film of the present invention, from the viewpoint of exhibiting excellent dimensional stability, it is preferable that a temperature expansion coefficient (at) in at least one direction in the plane direction of the film is 14 ppm/° C. or less. With respect to the temperature expansion coefficient (at) in the width direction of the film, when the temperature expansion coefficient in at least one direction of the film is preferably equal to or less than the upper limit, for example, the direction is made in conformity with the direction of the film where the dimensional stability is most likely required, which makes it possible to exhibit excellent dimensional stability against environmental changes on the obtained film. The lower limit of the temperature expansion coefficient (at) is preferably −10 ppm/° C. or more, more preferably −7 ppm/° C. or more, and particularly preferably −5 ppm/° C. or more; and the upper limit thereof is more preferably 10 ppm/° C. or less, still more preferably 7 ppm/° C. or less, and particularly preferably 5 ppm/° C. or less. For example, when formed into a magnetic recording tape, in view of the fact that excellent dimensional stability against dimensional changes due to ambient temperature and humidity changes can be exhibited, the direction where the temperature expansion coefficient is satisfied is preferably the width direction of the laminated polyester film.

In the laminated polyester film of the present invention, the Young's modulus of the film in at least one direction of the film plane direction, and preferably in the direction where the temperature expansion coefficient is 14 ppm/° C. or less is preferably at least 4.5 GPa or more. Though the upper limit thereof is not particularly limited, in general, it is preferably about 12 GPa. The range of the Young's modulus is more preferably 5 to 11 GPa, and particularly preferably 6 to 10 GPa. When the Young's modulus falls outside the range, there may be the case where it is difficult to attain the aforementioned at and ah, or the mechanical characteristics are insufficient. Such a Young's modulus can be adjusted by stretching as described later while satisfying the aforementioned relationship of $W_{AB}$, $W_A$, and $W_B$ in the dimer acid and/or the dimer diol. The direction where the temperature expansion coefficient is 14 ppm/° C. or less may be at least one direction, and preferably one where the width direction is satisfied as described above. As a matter of course, in view of the dimensional stability, it is preferable that the direction orthogonal to the width direction similarly satisfies not only the temperature expansion coefficient and the humidity expansion coefficient but also the Young's modulus and the like.

Now, when a magnetic layer or a backcoat layer or the like is applied to the laminated polyester film, heating is carried out in an oven for drying. As one index of the step appropriate ability in the drying step, a film elongation percentage at 110° C. to be described later can be considered. When the film elongation percentage is high, troughs occur in the step, which cause coating unevenness. Therefore, in general, the film elongation percentage is preferably lower. The film elongation percentage is preferably 3.0 or less. The film elongation percentage is preferably 2.5%, or less, more preferably 2.0% or less, and still more preferably 1.5% or less.

When the laminated polyester film of the present invention is used as, for example, a base film for a magnetic tape, in order to achieve both electromagnetic conversion characteristics and film conveyability, different surface properties can be imparted to the surface of the film layer A and the surface of the film layer B, which is preferable. For example, by applying a magnetic layer on a flat surface having small surface roughness and a backcoat layer on a rough surface having large surface roughness, both the required flatness and conveyability can be achieved on high levels. From such a viewpoint, the absolute value (|RaA−RaB|) of the difference between the surface roughness (RaA) of the surface of the film layer A and the surface roughness (RaB) of the film layer B is preferably 1.0 nm or more. Meanwhile, if the absolute value (|RaA−RaB|) is too large, and the flatness can be initially secured, the flatness is impaired by transfer when stored in a state of a film roll or the like, so that the absolute value (|RaA−RaB|) is preferably suppressed to 6.0 nm or less. The absolute value (|RaA−RaB|) is preferably 1.5 to 5.5 nm, more preferably 2.0 to 5.0 nm, and particularly preferably 2.5 to 4.5 nm.

In the laminated polyester film of the present invention, a ratio (dA/dB) of a thickness (dA) of the film layer A and a thickness (dB) of the film layer B is not particularly limited as long as the aforementioned relationship of WAB, WA, and WB is satisfied. From the viewpoint of controlling the aforementioned surface properties, the ratio (dA/dB) is preferably 0.03 to 33, and more preferably 0.05 to 20. At this time, a film layer having large surface roughness is suitable for collecting and reusing parts which have not become a product, whereby, when the film layer having large surface roughness is thicker than a film layer having small surface roughness, the parts which have not become a product can be collected and frequently used. Meanwhile, when the film layer having small surface roughness is thicker than the film layer having large surface roughness, good flatness can be imparted on a higher level. From such a viewpoint, it is effective to adjust the ratio of the thickness of the film layer having small surface roughness and the thickness of the film layer having large surface roughness in accordance with the required characteristics of the base film. When a lower cost laminated polyester film is required, the ratio of the thicknesses is preferably 0.7 or less, more preferably 0.6 or less, and particularly preferably 0.5 or less. Meanwhile, when good surface properties are required from the viewpoint of applying the magnetic layer, the ratio of the thicknesses is preferably 2.0 or more, more preferably 3.0 or more, and particularly preferably 4.0 or more.

When the laminated polyester film of the present invention is used as the base film of the magnetic recording medium, the upper limit of the surface roughness of a rough surface having large surface roughness is preferably 8.0 nm, more preferably 7.0 nm, and particularly preferably 6.0 nm, whereas the lower limit thereof is preferably 2.0 nm, more preferably 3.0 nm, and particularly preferably 4.0 nm. When the laminated polyester film of the present invention is used for the base film of the magnetic recording medium, the upper limit of the surface roughness of a flat surface having small surface roughness is preferably 5.0 nm, more preferably 4.5 nm, and particularly preferably 4.0 nm, whereas the lower limit thereof is preferably 1.0 nm, more preferably 1.5 nm, and particularly preferably 2.0 nm.

Now, by controlling the range of dA/dB and the aforementioned $W_B-W_A$ or $W_A-W_B$ in the laminated polyester film of the present invention, not only excellent dimensional stability but also the curl of the film in the width direction can be suppressed. Two first and second aspects will be described below as preferable aspects.

First, in the first aspect in which layers have different dimer acid contents, it is preferable that the ratio dA/dB is 0.7 or less, and the difference between the dimer acid contents in the film layer A and the film layer B ($W_B-W_A$ or $W_A-W_B$) is preferably 0.3 to 2.5 mol %. The difference between the contents is more preferably 0.5 to 2.3 mol %, still more preferably 0.7 to 2.1 mol %, and particularly preferably 0.9 to 1.9 mol %. When the thickness dA is small and the thickness dB is large, the curl can be effectively suppressed by reducing the difference between the contents. The upper limit of the ratio dA/dB is preferably 0.6, more preferably 0.5, and particularly preferably 0.4. Meanwhile, the lower limit thereof is not particularly limited, but it is preferably 0.1, more preferably 0.15, and particularly preferably 0.20.

Next, in the second aspect in which layers have different dimer acid contents, it is preferable that the ratio dA/dB is 2.0 or more, and the difference ($W_B-W_A$ or $W_A-W_B$) between the dimer acid contents in the film layer A and the film layer B is preferably 2.5 to 7.0 mol %. The difference between the contents is preferably 2.7 to 6.8 mol %, more preferably 2.9 to 6.6 mol %, and particularly preferably 3.1 to 6.4 mol %. When the thickness dB is small and the thickness dA is large, the curl can be effectively suppressed by increasing the difference between the contents. The lower limit of the ratio dA/dB is preferably 2.5, more preferably 3.0, and particularly preferably 3.5. Meanwhile, the upper limit thereof is not particularly limited, but it is preferably 9.0, more preferably 8.5, and particularly preferably 8.0.

First, in the first embodiment in which layers have different dimer diol contents, the ratio dA/dB is 0.7 or less, and the upper limit of the ratio dA/dB in which the composition ratio difference ($W_B-W_A$ or $W_A-W_B$) between the dimer diols of the film layer A and the film layer B is preferable is preferably 0.6, more preferably 0.5, and particularly preferably 0.4. Meanwhile, the lower limit thereof is not particularly limited, but it is preferably 0.1, more preferably 0.15, and particularly preferably 0.2.

By adjusting the composition ratio of the dimer diols in the A layer and the B layer in the range of dA/dB, the curl of the obtained polyester film can be reduced while the humidity expansion coefficient is reduced. Specifically, when the ratio dA/dB is 0.7 or less, the composition ratio difference between the dimer diols in the A layer and the B layer is 0.3 to 2.5 mol %, preferably 0.5 to 2.3 mol %, more preferably 0.7 to 2.1 mol %, and particularly preferably 0.9 to 1.9 mol %. When the thickness dA is small and the thickness dB is large, the curl can be effectively suppressed by reducing $W_B-W_A$ or $W_A-W_B$.

Next, in the second embodiment in which layers have different dimer diol contents, the ratio dA/dB is 2.0 or more, and the composition ratio difference ($W_B-W_A$ or $W_A-W_B$) between the dimer diols of the film layer A and the film layer B is preferably 2.5 to 7.0, preferably 2.7 to 6.8 mol %, more preferably 2.9 to 6.6 mol %, and particularly preferably 3.1 to 6.4 mol %. When the thickness dB is small and the thickness dA is large, the curl can be effectively suppressed by increasing $W_B-W_A$ or $W_A-W_B$. The lower limit of the ratio dA/dB is preferably 2.5, more preferably 3.0, and particularly preferably 3.5. Meanwhile, the upper limit thereof is not particularly limited, but it is preferably 9.0, more preferably 8.5, and particularly preferably 8.0.

By suppressing the curl of the laminated polyester film, for example, coating unevenness in a step of applying a magnetic layer or the like can be reduced, which makes it possible to reduce problems on the occasion of reading and writing recording with a magnetic head when the laminated polyester film is used as a magnetic recording tape. From such a viewpoint, the curl of the laminated polyester film calculated by curl measurement to be described later is preferably −1.0 to 2.0, more preferably −0.8 to 1.8, still more preferably −0.6 to 1.6, and particularly preferably −0.4 to 1.4.

<Method for Producing Laminated Polyester Film>

As described above, the laminated polyester film of the present invention is preferably an oriented polyester film, and particularly preferably a film stretched in the film forming direction and the width direction to increase molecular orientation in the respective directions. It is preferable that the laminated polyester film is produced by, for example, the following method because it is easy to increase the Young's modulus and to reduce the temperature expansion coefficient and the humidity expansion coefficient while keeping the film forming properties.

First, the polyester or polyester composition used as a raw material for each of the aforementioned film layers is dried. Then, respective molten polyesters are laminated within a die, and then extruded into a film form, and preferably, the molten polyesters are extruded at a temperature of a melting point (Tm: ° C.) of each polyester to (Tm+70)° C. Alternatively, two or more kinds of molten polyesters are extruded from a die, laminated, and then quenched for solidification to form a laminated unstretched film. Furthermore, the unstretched film is subjected to, for example, biaxial stretching to provide an oriented laminated polyester film.

In order to achieve at, ah, and Young's modulus and the like as specified in the present invention, it is necessary to facilitate subsequent stretching. In the polyester of the present invention, there is a tendency that its crystallization rate is fast, and from such a viewpoint, it is preferable to carry out cooling by the cooling drum very quickly. From such a viewpoint, it is preferable to carry out cooling at a low temperature of 20 to 60° C. When cooling is carried out at such a low temperature, the crystallization in a state of the unstretched film is suppressed, which make it possible to carry out subsequent stretching more smoothly.

For biaxial stretching, a method which is known per se can be adopted, and the biaxial stretching may be either sequential biaxial stretching or simultaneous biaxial stretching.

Here, a producing method of sequential biaxial stretching in which longitudinal stretching, lateral stretching, and a heat treatment are carried out in this order will be described as an example. First, first longitudinal stretching is carried out to an extent of 3 to 8 times at a temperature of a glass transition temperature (Tg: ° C.) of the copolyester to (Tg+40)° C.; stretching in the transverse direction is then carried out to an extent of 3 to 8 times at a temperature higher than that of the preceding longitudinal stretching and ranging from (Tg+10) to (Tg+50)° C.; and as the heat treatment, a heat set treatment is carried out at a temperature equal to or lower than a melting point of the copolyester and ranging (Tg+50) to (Tg+150)° C. for 1 to 20 seconds, and preferably 1 to 15 seconds.

While the sequential biaxial stretching has been described above, the laminated polyester film of the present invention can also be produced by simultaneous biaxial stretching in which longitudinal stretching and lateral stretching are carried out at the same time. For example, the simultaneous biaxial stretching may be carried out by reference to the previously described stretching ratio and stretching temperature and the like.

The laminated polyester film of the present invention may include a coating layer in order to impart easy slipping or easy adhesion. When the coating layer is provided, it is preferable to apply a desired coating solution to one or both surfaces of the unstretched film or the uniaxially stretched film, and thereafter subject the film to biaxial stretching and a heat treatment in the same manner as described above.

Now, the laminated polyester film of the present invention can be provided with the aforementioned |RaA−RaB| by causing the film layer to contain inert particles and adjusting the shape, particle diameter, and content of the inert particles to be contained. The inert particles to be contained are preferably particles which do not originally contain coarse particles or contain very few coarse particles. Therefore, the inert particles are preferably particles which are likely to have a sharp particle size distribution curve and are likely to be present in a state of primary particles. The inert particles are preferably at least one kind selected from the group consisting of organic polymer particles such as silicone particles, crosslinked acrylic resin particles, crosslinked polyester particles, and crosslinked polystyrene particles, spherical silica particles, and composite particles composed of silica and an organic polymer, and particularly preferably at least one kind selected from the group consisting of silicone particles, crosslinked polystyrene particles, spherical silica particles, and silica-acryl composite particles. As a matter of course, when these particles are contained, it is preferable to perform filtration using a filter, treat the surface of the particles with a dispersant, or enhance kneading in an extruder in order to further eliminate coarse particles.

According to the present invention, by using the laminated polyester film of the present invention as a base film, forming a nonmagnetic layer and a magnetic layer in this order on one surface thereof, and forming a backcoat layer on the other surface, or other means, a magnetic recording tape for data storage or the like can be provided.

The aromatic polyester having a specified amount of the dimer acid component and/or dimer diol copolymerized therein and the polyester forming other layer may be copolymerized with other copolymerization component which is known per se as long as the effects of the present invention are not impaired.

<<Base Film for Magnetic Tape and Magnetic Recording Medium>>

The polyester film and the laminated polyester film of the present invention can be suitably used as a base film for magnetic tape. Accordingly, the present invention also relates to the use of the polyester film and laminated polyester film as the base film for magnetic tape, and the use method thereof.

Furthermore, the present invention also relates to a magnetic recording medium including the polyester film or the laminated polyester film, and a magnetic layer formed on at least one surface thereof.

EXAMPLES

The present invention will be more specifically described below by reference to the following Examples and Comparative Examples. In the present invention, the characteristics were measured and evaluated in the following methods.

<<Evaluation Method>>

(1) Young's Modulus

The obtained film was cut to a width of 10 mm and a length of 15 cm to obtain a sample, and the sample was pulled by a universal tensile tester (trade name: Tensilon, manufactured by Toyo Baldwin Co., Ltd.) at a chuck interval of 100 mm, a pulling rate of 10 mm/min and a chart rate of 500 mm/min. A Young's modulus was calculated from a tangent of a rising portion in the obtained load-elongation curve.

(2) Temperature Expansion Coefficient (αt)

The obtained film was cut to a length of 15 mm and a width of 5 mm so that the film forming direction and width direction of the film became the measurement direction, respectively. The sample was set in TMA3000, manufactured by ULVAC-RIKO, Inc., pretreated in a nitrogen atmosphere (0% RH) at 60° C. for 30 minutes, and then cooled to room temperature. Thereafter, the sample was heated from 25° C. to 70° C. at a temperature elevation rate of 2° C./min, thereby measuring a length of the sample at each temperature. Subsequently, a temperature expansion coefficient (αt) was calculated according to the following formula. The measurement direction was the longitudinal direction of the cut sample; and the measurement was carried out 5 times, and an average value thereof was used.

$$\alpha t = \{(L60-L40)\}/(L40 \times \Delta T)\} + 0.5$$

Here, in the above formula, L40 is a length (mm) of the sample at 40° C.; L60 is a length (mm) of the sample at 60° C.; ΔT is 20 (=60–40)° C.; and 0.5 is a temperature expansion coefficient (×10–6/° C.) of quartz glass.

(3) Humidity Expansion Coefficient (αh)

The obtained film was cut to a length of 15 mm and a width of 5 mm so that the film forming direction and width direction of the film became the measurement direction, respectively. The sample was set in TMA3000, manufactured by ULVAC-RIKO, Inc., to measure a length of the sample at a humidity of 30% RH and 70% RH, respectively in a nitrogen atmosphere at 30° C. Subsequently, a humidity expansion coefficient was calculated according to the following formula. The measurement direction was the longitudinal direction of the cut sample; and the measurement was carried out 5 times, and an average value thereof was designated as αh.

$$\alpha h = (L70 - L30)/(L30 \times \Delta H)$$

Here, in the formula, L30 is a length (mm) of the sample at 30% RH; L70 is a length (nm) of the sample at 70% RH; and ΔH is 40 (=70–30) % RH.

(4) Contact Angle of Water

Using a contact angle measurement image analyzer (G-1-1000) manufactured by ERMA INC., a contact angle after 10 seconds from the dropping of water was measured.

(5) Determination of Dimer Acid, Dimer Diol, and Diethylene Glycol 20 mg of a sample was dissolved in 0.6 mL of a mixed solvent of deuterated trifluoroacetic acid:deuterated chloroform=1:1 (volume ratio) at room temperature, and the amount of dimer acid in a polymer chip and film was calculated by $^1$H-NMR at 500 MHz.

(6) Intrinsic Viscosity (IV)

The intrinsic viscosities of the obtained copolyester and film were determined at 35° C. by dissolving the polymer using a mixed solvent of p-chlorophenol/tetrachloroethane (40/60 weight ratio).

(7) Glass Transition Temperature (Tg) and Melting Point (Tm)

The glass transition temperature (extrapolated onset temperature) and the melting point were measured using a sample of 10 mg at temperature rise rate of 20° C./min by a DSC (manufactured by TA Instruments Co., Ltd., product name: Thermal Analyst2100).

(8) Film Elongation Percentage at 110° C.

The obtained film was cut to a length of 20 mm and a width of 4 mm so that the film forming direction of the film became the measurement direction. The resulting film was set in EXSTAR6000 manufactured by SII, and kept at 30° C. in a nitrogen atmosphere (0% RH). The film was then heated at 2° C./min to 150° C. under a stress of 20 MPa in the film forming direction, and a sample length was measured at each temperature. A degree of expansion in the length direction was calculated according to the following formula from the film length (L110) at 110° C. with respect to the film length (L30) before being heated after being kept at 30° C.

$$\text{Coating Suitability } (\%) = (L110 - L30)/L30 \times 100$$

(9) Surface Roughness (Ra)

Measurement was carried out using a non-contact three-dimensional surface roughness meter (manufactured by Zygo Corporation: New View 5022) under the following conditions: measurement magnification: 10, measurement area: 283 μm×213 μm (=0.0603 mm2). The center plane average roughness (Ra) was determined for each surface using the surface analysis software Metro Pro built in the roughness meter. When the difference between the surface roughnesses was 0.1 nm or less, an average value thereof was described as the same surface roughness.

(10) Thickness of Film Layer and Thickness Patio dA/dB

In the case of the unstretched film, the cross-section of the film in the direction perpendicular to the film forming direction was cut out with a microtome (ULTRACUT-S), and the thickness of each of the layers A and B was then calculated using an optical microscope. In the case of the oriented laminated polyester film, the film was cut out in the similar way as above, and the thickness of each of the layers A and B was then calculated using a transmission electron microscope, to determine a thickness ratio dA/dB.

The entire thickness of the polyester film can be measured and known by a method which is known per se. For example, a film sample was measured for thickness at 10 positions with an electric micrometer (K-402B, manufactured by Anritsu Corporation), and an average value thereof is designated as a film thickness.

(11) Preparation of Magnetic Tape

A backcoat layer coating material having the following composition is coated on a rough surface layer-side surface of the laminated biaxially oriented polyester film having a width of 1000 mm and a length of 1000 m and obtained in each of Examples and Comparative Examples by a die coater (tension during processing: 20 MPa, temperature: 120° C., speed: 200 m/min); and after drying, a nonmagnetic coating material and a magnetic coating material having the following compositions were simultaneously coated on a flat layer-side surface of the film by a die coater while changing the film thickness and magnetically oriented, followed by drying. Furthermore, the resulting film is subjected to a calendar treatment by a small-sized test calendar apparatus (steel roll/nylon roll, five stages) at a temperature of 70° C. and at a linear pressure of 200 kg/cm, and then cured at 70° C. for 48 hours. The tape was slit into 12.65 mm and inserted in a cassette to fabricate a magnetic recording tape. The coating amounts of the coating materials were adjusted so that the thicknesses of the backcoat layer, the nonmagnetic layer, and the magnetic layer after drying were respectively 0.5 μm, 1.2 μm, and 0.1 μm.

<Composition of Nonmagnetic Coating Material>

Titanium dioxide fine particle: 100 parts by weight
S-Lec A (vinyl chloride/vinyl acetate copolymer, manufactured by Sekisui Chemical Co., Ltd.): 10 parts by weight
Nippolane 2304 (polyurethane elastomer, manufactured by Nippon Polyurethane Industry Co., Ltd.): 10 parts by weight
Coronate L (polyisocyanate, manufactured by Nippon Polyurethane Industry Co., Ltd.): 5 parts by weight
Lecithin: 1 part by weight
Methyl ethyl ketone: 75 parts by weight
Methyl isobutyl ketone: 75 parts by weight
Toluene: 75 parts by weight
Carbon black: 2 parts by weight
Lauric acid: 1.5 parts by weight <Composition of Magnetic Coating Material>

Iron (length: 0.037 μm, acicular ratio: 3.5, 2350 ersteds): 100 parts by weight
S-Lec A (vinyl chloride/vinyl acetate copolymer, manufactured by Sekisui Chemical Co., Ltd.): 10 parts by weight
Nippolane 2304 (polyurethane elastomer, manufactured by Nippon Polyurethane Industry Co., Ltd.): 10 parts by weight Coronate L (polyisocyanate, manufactured by Nippon Polyurethane Industry Co., Ltd.): 5 parts by weight
Lecithin: 1 part by weight
Methyl ethyl ketone: 75 parts by weight
Methyl isobutyl ketone: 75 parts by weight
Toluene: 75 parts by weight
Carbon black: 2 parts by weight
Lauric acid: 1.5 parts by weight <Composition of Coating Material for Backcoat Layer>
Carbon black: 100 parts by weight
Thermoplastic polyurethane resin: 60 parts by weight
Isocyanate compound: 18 parts by weight
(Coronate L, manufactured by Nippon Polyurethane Industry Co., Ltd.)
Silicone oil: 0.5 parts by weight
Methyl ethyl ketone: 250 parts by weight
Toluene: 50 parts by weight

(12) Electromagnetic Conversion Characteristics

For the measurement of electromagnetic conversion characteristics, a head-fixed ½-inch linear system was used. For recording, an electromagnetic induction type head (track width: 25 µm, gap: 0.1 µm) was used; and for regeneration, an MR head (8 µm) was used. A relative speed of head/tape was set at 10 m/sec; signals at a recording wavelength of 0.2 µm were recorded; the regenerative signals were subjected to frequency analysis by a spectrum analyzer; a ratio of an output C of a carrier signal (wavelength: 0.2 µM) to an integrated noise N of a full spectrum region was defined as a C/N ratio; and a relative value was determined while defining a value of Example 1 prepared by the method in the above (11) as 0 dB, and evaluated according to the following criteria.

Very Good: +1 dB or more
Good: −1 dB or more and less than +1 dB
Poor: less than −1 dB

(13) Error Rate

A web of tape prepared in the above (11) was slit in the width of 12.65 mm (½ inch) and incorporated in a case for LTO, and a data storage cartridge with the length of magnetic recording tape of 850 m was assembled. The data storage was recorded using LTO5 drive manufactured by IBM Corporation under the environment of 23° C., 50% RH (recording wavelength: 0.55 µm), and then the cartridge was stored under the environment 50° C., 80% RH for 7 days. After storing the cartridge at normal temperature for one day, and an error rate of the signal reproduced over the whole length was measured. The error rate is calculated from the error information (the number of error bits) output by the drive according to the following formula. Dimensional stability is evaluated according to the following criteria.

Error rate=(the number of error bits)/(the number of recorded bits)

Very Good: An error rate is less than $1.0 \times 10^{-6}$.
Good: An error rate is $1.0 \times 10^{-6}$ or more and less than $1.0 \times 10^{-4}$.
Poor: An error rate is $1.0 \times 10^{-4}$ or more.

(14) Dropout (DO)

The data storage cartridge, used in the above (13) to measure the error rate, was set in LTO5 drive manufactured by IBM Corporation, and a data signal of 14 GB was recorded to the storage, and then reproduced. A signal with an amplitude (P-P value) equal to or less than 50% of the mean signal amplitude was detected as a missing pulse, and continuous missing pulses of 4 or more were detected as a dropout. The dropout is evaluated over a whole length of one roll of tape (850 m), converted to the number per 1 m, and judged according to the following criteria.

Very Good: Dropout is less than 3/m
Good: Dropout is 3/m or more and less than 9/m
Poor: Dropout is 9/m or more

(15) Curl

In the following Experiments III and IV relating to the laminated polyester film, the laminated polyester film was cut into strips having a length of 170 mm in the film forming direction (MD) and a width of 15.7 mm in the width direction (TD). A surface having small surface roughness is allowed to stand so that it is in contact with a free roll having a roll-to-roll distance of about 6 cm. A load of 0.07 MPa is applied to each end, and the end of the film curling in the roll direction or in the opposite direction to the roll is observed. A curl in the same direction as that of the roll is defined as a minus value, and a curl in the opposite direction to that of the roll is defined as a plus value. Curl sizes at both ends are read by using LK-G30 manufactured by Keyence Corporation. The average value thereof is defined as the curl size.

Experiment I: Copolyester Containing Dimer Acid

Production Examples

<Resin I-A1>
Transesterification was performed by using dimethyl 2,6-naphthalenedicarboxylate as a dicarboxylate component and ethyleneglycol as a diol component in the presence of titanium tetrabutoxide, and the product was continuously polycondensed to obtain a polyethylenenaphthalate pellet I-A1 (IV=0.58 dl/g, Tg=115° C., Tm=263° C.).

<Resin I-A2>
Transesterification was performed by using dimethyl terephthalate as a dicarboxylate component and ethyleneglycol as a diol component in the presence of titanium tetrabutoxide, and the product was continuously polycondensed to obtain a polyethyleneterephthalate pellet I-A2 (IV=0.58 dl/g, Tg=76° C., Tm=254° C.).

<Resin I-B1>
Transesterification was performed by using dimethyl 2,6-naphthalenedicarboxylate and Priplast 1838 as a dicarboxylate component, and ethyleneglycol as a diol component in the presence of titanium tetrabutoxide, and the product was continuously polycondensed to obtain a dimer acid-copolymerized polyethylenenaphthalate pellet I-B1 (IV=0.58 dl/g, Tg=58° C., Tm=232° C.). The content of dimer acid as the acid component was found to be 10.6 mol % by NMR analysis.

<Resin I-B2>
Transesterification was performed by using dimethyl terephthalate and Priplast1838 as a dicarboylate component, and ethyleneglycol as a diol component in the presence of titanium tetrabutoxide, and the product was continuously polycondensed to obtain a dimer acid-copolymerized polyethyleneterephthalate pellet I-B2 (IV-0.58 dl/g, Tg=47° C., Tm=244° C.). The product was prepared so that the content of dimer acid as the acid component was 10.6 mol %.

<Resin I-B3>
Transesterification was performed by using 2,6-naphthalenedicarboxylic acid and Pripol 1004 as a dicarboxylate component and ethyleneglycol as a diol component in the presence of titanium tetrabutoxide, and the product was continuously polycondensed to obtain a dimer acid-copolymerized polyethylenenaphthalate pellet I-B3 (IV=0.58 dl/g). The product was prepared so that the content of dimer acid as the acid component was 10.6 mol %.

<Resin I-C1>

The pellets I-A1 and I-B1 were blended at a mass ratio of 90:10 to obtain a resin I-C1. The content of a dimer acid component in the resin I-C1 was 0.9 mol %.

The resin I-C1 contained 0.25% by mass of spherical silica particles having an average particle size of 0.1 μm as a lubricant with reference to the mass of a film, and 0.04% by mass of spherical silica particles having an average particle size of 0.3 μm.

<Resins I-C2 to C4, C7, and C10 to C13>

Resins I-C2 to C4, C7, and C10 to C13 containing the same lubricant as that of the resin I-C1 were obtained in the same manner as in the resin I-C1 except that the types and amounts of resins to be used were changed as described in Table 1.

<Resin I-C5 and C6>

"Ultem1010" manufactured by SABIC Innovative Plastics company was prepared as polyetherimide. The prepared polyetherimide and the pellets I-A2 and I-B2 were blended at a mass ratio of 5:79:16 to obtain a resin I-C5. The blend ratio was changed as shown in Table 1 to obtain a resin I-C6.

<Resin I-C8>

The lubricant composition of the resin I-C2 was changed as follows. Only 0.08% by mass of spherical silica particles having an average particle size of 0.1 μm were contained with reference to the mass of a film (a film layer A of Example I-10) to obtain a resin I-C8.

<Resin I-C9>

The lubricant composition of the resin I-C2 was changed as follows. 0.12% by mass of spherical silica particles having an average particle size of 0.1 μm and 0.13% by mass of spherical silica particles having an average particle size of 0.3 μm were contained with reference to the mass of a film (a film layer B of Example I-10) to obtain a resin I-C9.

Example I-1

The resin I-C1 thus obtained was extruded at 280° C. onto a cooling drum under rotation at a temperature of 60° C. to obtain an unstretched film. The unstretched film was heated so that the film surface temperature became 130° C. using an IR heater placed above the film between two rolls having different rotation speeds along the film forming direction, and stretched in the longitudinal direction (film forming direction) at a stretching ratio of 4.5 times to obtain a uniaxially stretched film. The uniaxially stretched film was then introduced to a stenter, stretched in the transverse direction (width direction) at a stretching ratio of 5.0 times at 130° C., and was heat set at 210° C. for 3 seconds to obtain a biaxially oriented polyester film having a thickness of 5.0 μm.

Examples I-2 to 9 and Comparative Examples I-1 to 4

The molding conditions of resins and films were changed as described in Table 1 to obtain biaxially oriented polyester films of Examples I-2 to 9 and Comparative Examples I-1 to 4 as described in Example I-1.

Example I-10

The resins I-C8 and C9 were respectively extruded at 280° C. as a film layer A and a film layer B, and converged by a feed block so that the thickness ratio (dA:dB) of the layers A and B was set at 3:7. Thereafter, the molding conditions of the film were changed as described in Table 1 to obtain a biaxially oriented polyester film of Example I-10 as described in Example I-1.

TABLE 1

| | | MOLDING CONDITIONS OF UNSTRETCHED FILM | | LONGITUDINAL STRETCHING | | LATERAL STRETCHING | | HEAT SET TREATMENT | |
|---|---|---|---|---|---|---|---|---|---|
| | | COOLING DRUM | EXTRUSION | | | | | | |
| | RESIN USED (MASS RATIO) | TEMPERATURE [° C.] | TEMPERATURE [° C.] | TEMPERATURE [° C.] | RATIO | TEMPERATURE [° C.] | RATIO | TEMPERATURE [° C.] | TIME [SECOND] |
| EXAMPLE I-1 | I-C1: I-A1 (90) + I-B1 (10) | 60 | 280 | 130 | 4.5 | 130 | 5.0 | 210 | 3 |
| EXAMPLE I-2 | I-C2: I-A1 (84) + I-B1 (16) | 60 | 280 | 130 | 4.0 | 130 | 5.0 | 200 | 3 |
| EXAMPLE I-3 | I-C2: I-A1 (84) + I-B1 (16) | 60 | 280 | 130 | 5.0 | 130 | 4.0 | 200 | 3 |
| EXAMPLE I-4 | I-C2: I-A1 (84) + I-B1 (16) | 60 | 280 | 130 | 4.5 | 130 | 5.0 | 200 | 3 |
| EXAMPLE I-5 | I-C3: I-A1 (74) + I-B1 (26) | 60 | 280 | 120 | 4.8 | 120 | 5.5 | 200 | 3 |
| EXAMPLE I-6 | I-C4: I-A2 (84) + I-B2 (16) | 25 | 280 | 90 | 3.5 | 90 | 6.5 | 210 | 3 |
| EXAMPLE I-7 | I-C5: PEI (5) + I-A2 (79) + I-B2 (16) | 25 | 280 | 100 | 3.6 | 100 | 4.6 | 210 | 3 |
| EXAMPLE I-8 | I-C6: PEI (20) + I-A2 (64) + I-B2 (16) | 25 | 280 | 100 | 3.6 | 100 | 4.8 | 210 | 3 |
| EXAMPLE I-9 | I-C7: I-A1 (84) + I-B3 (16) | 60 | 280 | 130 | 4.5 | 130 | 5.5 | 210 | 3 |
| EXAMPLE I-10 | A LAYER: I-C8: I-A1 (84) + I-B1 (16) B LAYER: I-C9: I-A1 (84) + I-B1 (16) | 60 | 280 | 130 | 4.5 | 130 | 5.5 | 210 | 3 |
| COMPARATIVE EXAMPLE I-1 | I-C10: I-A2 (100) | 25 | 280 | 90 | 4.0 | 90 | 3.5 | 200 | 3 |
| COMPARATIVE EXAMPLE I-2 | I-C11: I-A1 (100) | 60 | 300 | 150 | 4.5 | 150 | 5.0 | 210 | 3 |
| COMPARATIVE EXAMPLE I-3 | I-C12: I-A1 (97) + I-B1 (3) | 60 | 300 | 150 | 4.5 | 150 | 5.0 | 210 | 3 |
| COMPARATIVE EXAMPLE I-4 | I-C13: I-A1 (59) + I-B1 (41) | 40 | 280 | 110 | 4.5 | 110 | 5.0 | 200 | 3 |

<<Results>>

Table 2 shows the compositions and evaluation results of the biaxially oriented polyester films obtained above. Because the polyester film of Comparative Example I-4 had a large film elongation during drying in the above-mentioned (11) Preparation of magnetic tape, which made it difficult to prepare a magnetic tape, the characteristics were not evaluated.

TABLE 2

| | | RESIN | | POLYESTER FILM | | | | | |
|---|---|---|---|---|---|---|---|---|---|
| | | | | YOUNG'S MODULUS [GPa] | | HUMIDITY EXPANSION COEFFICIENT [×10−6/% RH] | | TEMPERATURE EXPANSION COEFFICIENT [×10−6/° C.] | |
| | | DIMER ACID | | | | | | | |
| | RESIN TYPE | CONTENT [mol %] | CARBON NUMBER | MD | TD | MD | TD | MD | TD |
| EXAMPLE I-1 | PEN | 0.9 | 36 | 6.0 | 8.0 | 11.5 | 8.1 | 12.5 | 3.1 |
| EXAMPLE I-2 | PEN | 1.5 | 36 | 5.2 | 11.0 | 12.2 | 4.0 | 17.1 | −7.2 |
| EXAMPLE I-3 | PEN | 1.5 | 36 | 9.0 | 6.0 | 6.1 | 10.4 | −0.7 | 12.5 |
| EXAMPLE I-4 | PEN | 1.5 | 36 | 6.0 | 8.0 | 10.8 | 7.5 | 12.5 | 3.1 |
| EXAMPLE I-5 | PEN | 2.5 | 36 | 6.0 | 8.0 | 9.9 | 7.0 | 13.1 | 3.3 |
| EXAMPLE I-6 | PEN | 1.4 | 36 | 5.0 | 6.5 | 10.8 | 10.2 | 12.7 | 11.0 |
| EXAMPLE I-7 | PET + PEI | 1.6 | 36 | 5.0 | 6.5 | 11.0 | 10.1 | 12.5 | 11.3 |
| EXAMPLE I-8 | PET + PEI | 1.9 | 36 | 5.0 | 6.5 | 10.7 | 10.3 | 12.8 | 11.1 |
| EXAMPLE I-9 | PEN | 1.5 | 44 | 6.0 | 8.0 | 10.0 | 6.9 | 12.9 | 2.9 |
| EXAMPLE I-10 | PEN | 1.5 | 36 | 6.0 | 8.0 | 12.3 | 4.1 | 17.2 | −7.1 |
| COMPARATIVE EXAMPLE I-1 | PET | 0 | — | 5.0 | 6.5 | 10.8 | 12.3 | 9.1 | 12.6 |
| COMPARATIVE EXAMPLE I-2 | PEN | 0 | — | 6.0 | 8.0 | 12.3 | 9.1 | 12.4 | 3.0 |
| COMPARATIVE EXAMPLE I-3 | PEN | 0.3 | 36 | 6.0 | 8.0 | 11.7 | 8.7 | 12.5 | 3.5 |
| COMPARATIVE EXAMPLE I-4 | PEN | 4.0 | 36 | 4.0 | 7.0 | 14.2 | 11.0 | 25.1 | 15.3 |

| | POLYESTER FILM | | | | | |
|---|---|---|---|---|---|---|
| | CONTACT ANGLE OF WATER [°] | FILM ELONGATION PERCENTAGE [%] MD | Ra [nm] | ELECTRO-MAGNETIC CONVERSION CHARACTERISTICS | ERROR RATE | DROP OUT |
| EXAMPLE I-1 | 76 | 1.0 | 4.3 | GOOD | GOOD | GOOD |
| EXAMPLE I-2 | 79 | 1.4 | 4.2 | GOOD | GOOD | GOOD |
| EXAMPLE I-3 | 79 | 0.6 | 4.4 | GOOD | GOOD | GOOD |
| EXAMPLE I-4 | 79 | 1.1 | 4.3 | GOOD | VERY GOOD | VERY GOOD |
| EXAMPLE I-5 | 82 | 1.2 | 4.2 | GOOD | VERY GOOD | VERY GOOD |
| EXAMPLE I-6 | 78 | 1.5 | 4.4 | GOOD | GOOD | GOOD |
| EXAMPLE I-7 | 78 | 1.3 | 4.5 | GOOD | GOOD | GOOD |
| EXAMPLE I-8 | 78 | 0.7 | 4.3 | GOOD | GOOD | GOOD |
| EXAMPLE I-9 | 80 | 1.1 | 4.2 | GOOD | VERY GOOD | VERY GOOD |
| EXAMPLE I-10 | 79 | 1.1 | 3.0 (LAYER A) 5.1 (LAYER B) | VERY GOOD | VERY GOOD | VERY GOOD |
| COMPARATIVE EXAMPLE I-1 | 70 | 1.2 | 4.2 | GOOD | POOR | POOR |
| COMPARATIVE EXAMPLE I-2 | 72 | 0.8 | 4.3 | GOOD | POOR | POOR |
| COMPARATIVE EXAMPLE I-3 | 74 | 0.8 | 4.2 | GOOD | POOR | POOR |
| COMPARATIVE EXAMPLE I-4 | 87 | 3.8 | 4.4 | — | — | — |

In Tables 1 and 2, PEN means polyethylene-2,6-naphthalenedicarboxylate; PET means polyethylene terephthalate; PEI means polyetherimide; MD means a film forming direction; and TD means a width direction.

Experiment II: Copolyester Containing Dimer Diol

Production Examples

<Resin II-A1>

Transesterification was performed by using dimethyl 2,6-naphthalenedicarboxylate as a dicarboxylate component and ethyleneglycol as a diol component in the presence of titanium tetrabutoxide, and the product was continuously polycondensed to obtain a polyethylenenaphthalate pellet II-A1 (IV=0.58 dl/g, Tg=115° C., Tm=263° C.).

<Resin II-A2>

Transesterification was performed by using dimethyl terephthalate as a dicarboxylate component and ethyleneglycol as a diol component in the presence of titanium tetrabutoxide, and the product was continuously polycondensed to obtain a polyethyleneterephthalate pellet II-A2 (IV=0.58 dl/g, Tg=76° C., Tm=254° C.).

<Resin II-B1>

Transesterification was performed by using dimethyl 2,6-naphthalenedicarboxylate as a dicarboxylate component and ethyleneglycol and Pripol2033 as a diol component in the presence of titanium tetrabutoxide, and the product was continuously polycondensed to obtain a dimer diol-copolymerized polyethylenenaphthalate pellet II-B1 (IV-0.56 dl/g, Tg=76° C., Tm=252° C.). The content of dimer diol as a diol component was found to be 8.0 mol % by NMP analysis.

<Resin II-B2>

Transesterification was performed by using dimethyl terephthalate as a dicarboxylate component and ethyleneglycol and Pripol2033 as a diol component in the presence of titanium tetrabutoxide, and the product was continuously polycondensed to obtain a dimer diol-copolymerized polyethyleneterephthalate pellet II-B2 (IV=0.55 dl/g, Tg=51° C., Tm=251° C.). The product was prepared so that the content of dimer diol as a diol component was 8.0 mol %.

<Resin II-C1>

The pellets II-A1 and II-B1 were blended at a mass ratio of 93:7 to obtain a resin II-C1. The composition ratio of dimer diol contained in the resin II-C1 is 0.5 mol %.

The resin II-C1 contained 0.25% by mass of spherical silica particles having an average particle size of 0.1 μm as a lubricant, and 0.04% by mass of spherical silica particles having an average particle size of 0.3 μm with reference to the mass of a film.

<Resins II-C2 to C4 and C9 to C12>

Resins II-C2 to C4 and C9 to C12 containing the same lubricant as that of the resin II-C1 were obtained in the same manner as in the resin II-C1 except that the types and amounts of resins to be used were changed as described in Table 3.

<Resin II-C5 to C6>

"Ultem1010" manufactured by SABIC Innovative Plastics company was prepared as polyetherimide. The prepared polyetherimide and the pellets II-A2 and II-B2 were blended at a mass ratio of 5:78:17 to obtain a resin II-C5. The blend ratio was changed as shown in Table 3 to obtain a resin II-C6.

<Resin II-C7>

The lubricant composition of the resin II-C2 was changed as follows. Only 0.08% by mass of spherical silica particles having an average particle size of 0.1 μm were contained with reference to the mass of a film (a film layer A of Example II-9) to obtain a resin II-C7.

<Resin II-C8>

Similarly, the lubricant composition of the resin II-C2 was changed as follows. 0.12% by mass of spherical silica particles having an average particle size of 0.1 μm and 0.13% by mass of spherical silica particles having an average particle size of 0.3 μm were contained with reference to the mass of a film (a film layer B of Example II-9) to obtain a resin II-C8.

Examples II-1 to 8 and Comparative Examples II-1 to 4

The molding conditions of resins and films were changed as described in Table 3 to obtain biaxially oriented polyester films of Examples II-1 to 8 and Comparative Examples II-1 to 4 as described in Example I-1.

Example II-9

The resin II-C7 and the resin II-C8 were respectively extruded at 280° C. as a film layer A and a film layer B, and converged by a feed block so that the thickness ratio of the layers A and B (dA:dB) was set at 3:7. Thereafter, the molding conditions of the film were changed as described in Table 3 to obtain a biaxially oriented polyester film of Example II-9 as described in Example I-1.

TABLE 3

| | | MOLDING CONDITIONS OF UNSTRETCHED FILM | | LONGITUDINAL STRETCHING | | LATERAL STRETCHING | | HEAT SET TREATMENT | |
|---|---|---|---|---|---|---|---|---|---|
| | RESIN USED (MASS RATIO) | COOLING DRUM TEMPERATURE [° C.] | EXTRUSION TEMPERATURE [° C.] | TEMPERATURE [° C.] | RATIO | TEMPERATURE [° C.] | RATIO | TEMPERATURE [° C.] | TIME [SECOND] |
| EXAMPLE II-1 | II-C1: II-A1 (93) + II-B1 (7) | 60 | 290 | 130 | 4.5 | 130 | 5.0 | 210 | 3 |
| EXAMPLE II-2 | II-C2: II-A1 (83) + II-B1 (17) | 60 | 280 | 130 | 4.0 | 130 | 5.0 | 200 | 3 |
| EXAMPLE II-3 | II-C3: II-A1 (46) + II-B1 (54) | 60 | 280 | 120 | 4.0 | 120 | 5.0 | 190 | 3 |
| EXAMPLE II-4 | II-C2: II-A1 (83) + II-B1 (17) | 60 | 280 | 130 | 3.7 | 130 | 5.0 | 200 | 3 |
| EXAMPLE II-5 | II-C2: II-A1 (83) + II-B1 (17) | 60 | 280 | 130 | 4.5 | 130 | 4.0 | 200 | 3 |
| EXAMPLE II-6 | II-C4: II-A2 (83) + II-B2 (17) | 25 | 280 | 120 | 3.5 | 120 | 4.5 | 200 | 3 |
| EXAMPLE II-7 | II-C5: PEI (5) + II-A2 (78) + II-B2 (17) | 25 | 280 | 120 | 3.6 | 120 | 4.6 | 200 | 3 |

TABLE 3-continued

| | | MOLDING CONDITIONS OF UNSTRETCHED FILM | | | | | | | |
|---|---|---|---|---|---|---|---|---|---|
| | | COOLING DRUM | EXTRUSION | LONGITUDINAL STRETCHING | | LATERAL STRETCHING | | HEAT SET TREATMENT | |
| | RESIN USED (MASS RATIO) | TEMPERATURE [° C.] | TEMPERATURE [° C.] | TEMPERATURE [° C.] | RATIO | TEMPERATURE [° C.] | RATIO | TEMPERATURE [° C.] | TIME [SECOND] |
| EXAMPLE II-8 | II-C6: PEI (20) + II-A2 (63) + II-B2 (17) | 25 | 280 | 120 | 3.6 | 120 | 4.8 | 200 | 3 |
| EXAMPLE II-9 | A LAYER: I-C7: II-A1 (83) + II-B1 (17) B LAYER: I-C8: II-A1 (83) + II-B1 (16) | 60 | 280 | 130 | 4.5 | 130 | 5.5 | 210 | 3 |
| COMPARATIVE EXAMPLE II-1 | II-C9: II-A2 (100) | 25 | 280 | 120 | 3.5 | 120 | 4.5 | 200 | 3 |
| COMPARATIVE EXAMPLE II-2 | II-C10: II-A1 (100) | 60 | 300 | 150 | 4.5 | 150 | 5.0 | 210 | 3 |
| COMPARATIVE EXAMPLE II-3 | II-C11: II-A1 (97) + II-B1 (3) | 60 | 290 | 120 | 4.5 | 120 | 5.0 | 210 | 3 |
| COMPARATIVE EXAMPLE II-4 | II-C12: II-A1 (26) + II-B1 (78) | 60 | 270 | 110 | 4.5 | 110 | 5.0 | 190 | 3 |

<<Results>>

Table 4 shows the compositions and evaluation results of the biaxially oriented polyester films obtained above. Because the polyester films of Comparative Examples II-3 and 4 had a large film elongation during drying in the above-mentioned (11) Preparation of magnetic tape, which made it difficult to prepare a magnetic tape, the characteristics were not evaluated.

TABLE 4

| | | | | POLYESTER FILM | | | | | |
|---|---|---|---|---|---|---|---|---|---|
| | RESIN | | | YOUNG'S MODULUS [GPa] | | HUMIDITY EXPANSION COEFFICIENT [×10$^{-6}$/% RH] | | TEMPERATURE EXPANSION COEFFICIENT ×10$^{-6}$/° C. | |
| | | | Dimer DIOL | | | | | | |
| | RESIN TYPE | DEG [mol %] | CARBON NUMBER | [mol %] | MD | TD | MD | TD | MD | TD |
| EXAMPLE II-1 | PEN | 1.8 | 36 | 0.5 | 6.0 | 8.0 | 11.0 | 8.4 | 12.7 | 3.4 |
| EXAMPLE II-2 | PEN | 1.9 | 36 | 1.2 | 6.0 | 8.0 | 10.2 | 7.5 | 13.0 | 3.5 |
| EXAMPLE II-3 | PEN | 1.8 | 36 | 4.0 | 6.0 | 8.0 | 9.4 | 6.5 | 13.4 | 3.8 |
| EXAMPLE II-4 | PEN | 1.7 | 36 | 1.2 | 5.2 | 11.0 | 11.5 | 4.5 | 17.7 | -7.0 |
| EXAMPLE II-5 | PEN | 1.6 | 36 | 1.2 | 9.0 | 6.0 | 6.4 | 10.1 | -0.4 | 12.8 |
| EXAMPLE II-6 | PEN | 1.8 | 36 | 1.2 | 5.0 | 6.5 | 9.2 | 7.5 | 21.1 | 13.0 |
| EXAMPLE II-7 | PET + PEI | 1.7 | 36 | 1.2 | 5.0 | 6.5 | 9.1 | 7.6 | 20.9 | 12.8 |
| EXAMPLE II-8 | PET + PEI | 1.9 | 36 | 1.5 | 5.0 | 6.5 | 9.1 | 7.7 | 21.2 | 13.1 |
| EXAMPLE II-9 | PEN | 1.7 | 36 | 1.2 | 6.0 | 8.0 | 10.3 | 7.6 | 13.1 | 3.6 |
| COMPARATIVE EXAMPLE I-1 | PET | 1.8 | 36 | 0 | 5.0 | 6.5 | 10.1 | 8.7 | 21.0 | 13.1 |
| COMPARATIVE EXAMPLE I-2 | PEN | 1.7 | 36 | 0 | 6.0 | 8.0 | 12.0 | 8.9 | 12.4 | 3.4 |
| COMPARATIVE EXAMPLE I-3 | PEN | 1.6 | 36 | 0.2 | 6.0 | 8.0 | 12.1 | 8.9 | 12.4 | 3.3 |
| COMPARATIVE EXAMPLE I-4 | PEN | 1.7 | 36 | 6.0 | 4.0 | 7.0 | 13.0 | 7.5 | 26.5 | 8.3 |

| | POLYESTER FILM | | | | | |
|---|---|---|---|---|---|---|
| | FILM ELONGATION PERCENTAGE [%] MD | CONTACT ANGLE OF WATER [°] | Ra [nm] | ELECTROMAGNETIC CONVERSION CHARACTERISTICS | ERROR RATE | DROP OUT |
| EXAMPLE II-1 | 0.9 | 76 | 4.3 | GOOD | GOOD | GOOD |
| EXAMPLE II-2 | 1.4 | 82 | 4.4 | GOOD | VERY GOOD | VERY GOOD |
| EXAMPLE II-3 | 2.0 | 90 | 4.2 | GOOD | VERY GOOD | VERY GOOD |

TABLE 4-continued

| | | | | | | |
|---|---|---|---|---|---|---|
| EXAMPLE II-4 | 1.8 | 76 | 4.3 | GOOD | VERY GOOD | VERY GOOD |
| EXAMPLE II-5 | 0.4 | 76 | 4.3 | GOOD | VERY GOOD | VERY GOOD |
| EXAMPLE II-6 | 1.5 | 78 | 4.4 | GOOD | VERY GOOD | VERY GOOD |
| EXAMPLE II-7 | 1.3 | 78 | 4.3 | GOOD | VERY GOOD | VERY GOOD |
| EXAMPLE II-8 | 0.7 | 78 | 4.3 | GOOD | VERY GOOD | VERY GOOD |
| EXAMPLE II-9 | 1.4 | 82 | 2.9 (LAYER A) 5.0 (LAYER B) | VERY GOOD | VERY GOOD | VERY GOOD |
| COMPARATIVE EXAMPLE I-1 | 1.2 | 70 | 4.4 | GOOD | POOR | POOR |
| COMPARATIVE EXAMPLE I-2 | 0.8 | 72 | 4.3 | GOOD | POOR | POOR |
| COMPARATIVE EXAMPLE I-3 | 0.8 | 72 | 4.4 | GOOD | POOR | POOR |
| COMPARATIVE EXAMPLE I-4 | 3.7 | 92 | 4.2 | — | — | — |

Experiment III: Laminated Polyester Film Including Layers Having Different Dimer Acid Contents Production Examples <Resin III-C1>

The pellets I-A1 and I-B1 used in Experiment I were blended at a mass ratio of 97:3 to obtain a resin III-C1. The composition ratio of dimer acid contained in the resin C1 is 0.3 mol %.

<Resins III-C2 to C12 and C14 to C23>

Resins III-C2 to C12 and C14 to C23 were obtained in the same manner as in the resin III-C1 except that the types and amounts of resins to be used were changed as described in Tables 5 and 6.

<Resin III-C13 to C16>

"Ultem1010" manufactured by SABIC Innovative Plastics company was prepared as polyetherimide. The polyetherimide and the pellets I-A2 and I-B2 were blended at a mass ratio of 5:87:8 to obtain a resin III-C13. The composition ratio of dimer acid in the resin III-C13 is 0.7 mol %. These blend ratios were changed as shown in Table 5 to obtain resins III-C14 to C16.

Example III-1

A resin III-C1 was extruded at 300° C. as a film layer A, and a resin III-C2 was extruded at 280° C. as a film layer B. Then, using a feed block at 300° C., the film layer A and the film layer B were laminated in two layers so that the thickness ratio (dA/dB) of the film layer A and the film layer B was set at 0.4, and the laminated product was extruded into a sheet form onto a cooling drum under rotation at a temperature of 60° C. to obtain an unstretched film.

As a lubricant, 0.08% by mass of spherical silica particles having an average particle size of 0.1 μm were contained with reference to the mass of the film layer A in the film layer A, and 0.12% by mass of spherical silica particles having an average particle size of 0.1 μm and 0.13% by mass of spherical silica particles having an average particle size of 0.3 μm were contained with reference to the mass of the film layer B in the film layer B.

The unstretched film was heated so that the film surface temperature became 130° C. using an IR heater placed above the film between two rolls having different rotation speeds along the film forming direction, and stretched in the longitudinal direction (film forming direction) at a stretching ratio of 4.5 times to obtain a uniaxially stretched film. The uniaxially stretched film was then introduced to a stenter, stretched in the transverse direction (width direction) at a stretching ratio of 5.0 times at 130° C., and was heat set at 210° C. for 3 seconds to obtain a biaxially oriented laminated polyester film having a thickness of 4.0 μm.

Examples III-2 to 4, 7, 9, 15 to 18 and Comparative Examples III-2 to 4

Biaxially oriented polyester films of Examples III-2 to 4, 7, 9, 15 to 18 and Comparative Examples III-2 to 4 were obtained in the same manner as in Example III-1 except that the molding conditions of resins and films were changed as described in Tables 5 to 7.

Examples III-5 and 14

Biaxially oriented polyester films of Examples III-5 and 14 were obtained in the same manner as in Example III-1 except that the molding conditions of a resin and film were changed as shown in Tables 5 and 7, and the compositions of lubricants were changed. As the lubricant, 0.08% by mass of spherical silica particles having an average particle size of 0.1 μm were contained with reference to the mass of a film layer A in the film layer A, and 0.12% by mass of spherical silica particles having an average particle size of 0.1 μm and 0.13% by mass of spherical silica particles having an average particle size of 0.3 μm were contained with reference to the mass of a film layer B in the film layer B.

Examples III-6 and 8

In Examples III-6 and 8, biaxially oriented laminated polyester films were respectively obtained in the same manner as in Examples III-2 and 7. However, lubricants were changed from Examples III-2 and 7 as follows. When unstretching was provided, 0.12% by mass of spherical silica particles having an average particle size of 0.1 μm and 0.13% by mass of spherical silica particles having an average particle size of 0.3 μm were contained with reference to the mass of a film layer A in the film layer A. 0.08% by mass of spherical silica particles having an average particle size of 0.1 μm contained with reference to the mass of a film layer B in the film layer B.

Example III-10

A biaxially oriented polyester film of Example III-10 was obtained in the same manner as in Example III-1 except that the molding conditions of a resin and film were changed as described in Tables 5 and 7. However, 0.08% by mass of spherical silica particles having an average particle size of 0.1 μm were contained with reference to the mass of a film layer A in the film layer A, and 0.40% by mass of spherical silica particles having an average particle size of 0.1 μm and 0.01% by mass of crosslinked polystyrene particles having an average particle size of 0.2 μm were contained with reference to the mass of a film layer B in the film layer B.

Example III-11

An unstretched film was obtained in the same manner as in Example III-10 without a lubricant being added to both film layers A and B. Thereafter, the molding conditions of a film were changed as described in Tables 5 and 7 to obtain a uniaxially stretched film as described in Example III-1.

Thereafter, in order to impart lubricity, by using a coater, a coating layer A was formed on the film layer A so that the thickness of the coating layer A obtained after drying was set at 8 nm, and a coating layer B was formed on the film layer B using a coater so that the thickness of the coating layer B obtained after drying was set at 8 nm. A solid content composition in an aqueous coating solution used for forming the coating layers A and B is shown below.

Aqueous Coating Solution Used for Forming Coating Layer A: Solid Content Concentration 1.0% by mass
  Solid Content Composition
  Binder resin: acrylic-modified polyester, 67% by mass
  Inert particle: crosslinked acrylic resin particle (average particle size 15 nm), 6% by mass
  Surfactant: NOF CORPORATION, NONION NS-208.5, 1% by mass
  Surfactant: NOF CORPORATION, NONION NS-240, 26% by mass
Aqueous coating solution Used for Forming Coating Layer B: Solid Content Concentration 1.9% by mass
  Solid Content Composition
  Binder resin: acrylic-modified polyester, 58% by mass
  Binder resin: methylcellulose, 20% by mass
  Binder resin: siloxane-copolymerized acrylic resin, 3% by mass
  Inert particle: crosslinked acrylic particle (average particle size 40 nm), 9% by mass
  Surfactant: Sanyo Chemical Industries Ltd., NAROACTY N85, 10% by mass The molding conditions of the uniaxially stretched film including the coating layer were changed as described in Tables 5 and 7 to obtain a biaxially oriented laminated polyester film as described in Example III-1.

Example III-12

An unstretched film was obtained in the same manner as in Example III-10. However, 0.08% by mass of crosslinked polystyrene particles having an average particle size of 0.1 μm were contained with reference to the mass of a film layer A in the film layer A, and 0.40% by mass of crosslinked polystyrene particles having an average particle size of 0.1 μm and 0.01% by mass of crosslinked polystyrene particles having an average particle size of 0.2 μm were contained with reference to the mass of a film layer B in the film layer B. Stretching was performed in the same manner as in Example III-10 to obtain a biaxially oriented laminated polyester film.

Examples III-13 and 14

A biaxially oriented polyester film of Example III-13 was obtained in the same manner as in Example III-1 except that the molding conditions of resins and films were changed as described in Tables 5 to 7. However, 0.08% by mass of spherical silica particles having an average particle size of 0.1 μm were contained in a film layer A, and 0.40% by mass of spherical silica particles having an average particle size of 0.1 μm and 0.01% by mass of spherical silica particles having an average particle size of 0.2 μm were contained in a film layer B.

Comparative Example III-1

A biaxially oriented polyester film of Comparative Example III-1 was obtained in the same manner as in Example III-1 except that the molding conditions of a resin and film were changed as described in Tables 6 and 7, and a lubricant composition was changed. The lubricant composition was the same as in that of Example III-10.

TABLE 5

| | | MOLDING CONDITIONS OF UNSTRETCHED FILM | | | | |
|---|---|---|---|---|---|---|
| | | COOLING DRUM TEMPERATURE [° C.] | EXTRUSION TEMPERATURE [° C.] | FEED BLOCK TEMPERATURE [° C.] | LONGITUDINAL STRETCHING | |
| EXAMPLES | RESIN USED (MASS RATIO) UPPER STAGE: A LAYER LOWER STAGE: B LAYER | | UPPER STAGE: A LAYER LOWER STAGE: B LAYER | | TEMPERATURE [° C.] | RATIO |
| III-1 | III-C1: I-A1 (97) + I-B1 (3) III-C2: I-A1 (90) + I-B1 (10) | 60 | 300 280 | 300 | 130 | 4.5 |
| III-2 | III-C3: I-A1 (94) + I-B1 (6) III-C4: I-A1 (84) + I-B1 (16) | 60 | 300 280 | 300 | 130 | 4.5 |
| III-3 | III-C3: I-A1 (94) + I-B1 (6) III-C4: I-A1 (84) + I-B1 (16) | 60 | 300 280 | 300 | 130 | 3.7 |
| III-4 | III-C3: I-A1 (94) + I-B1 (6) III-C4: I-A1 (84) + I-B1 (16) | 60 | 300 280 | 300 | 130 | 4.5 |

TABLE 5-continued

| | | | | | | |
|---|---|---|---|---|---|---|
| III-5 | III-C5: I-A1 (69) + I-B1 (31) | 60 | 280 | 280 | 120 | 4.5 |
| | III-C6: I-A1 (47) + I-B1 (53) | | 280 | | | |
| III-6 | III-C3: I-A1 (94) + I-B1 (6) | 60 | 300 | 300 | 130 | 4.5 |
| | III-C4: I-A1 (84) + I-B1 (16) | | 280 | | | |
| III-7 | III-C7: I-A1 (96) + I-B1 (4) | 60 | 300 | 300 | 130 | 4.5 |
| | III-C8: I-A1 (67) + I-B1 (33) | | 280 | | | |
| III-8 | III-C7: I-A1 (96) + I-B1 (4) | 60 | 300 | 300 | 130 | 4.5 |
| | III-C8: I-A1 (67) + I-B1 (33) | | 280 | | | |
| III-9 | III-C9: I-A1 (93) + I-B1 (7) | 60 | 300 | 280 | 120 | 4.5 |
| | III-C10: I-A1 (30) + I-B1 (70) | | 270 | | | |
| III-10 | III-C11: I-A2 (98) + I-B2 (2) | 25 | 280 | 280 | 90 | 3.5 |
| | III-C12: I-A2 (81) + I-B2 (19) | | 280 | | | |
| III-11 | III-C11: I-A2 (98) + I-B2 (2) | 25 | 280 | 280 | 90 | 3.5 |
| | III-C12: I-A2 (81) + I-B2 (19) | | 280 | | | |
| III-12 | III-C11: I-A2 (98) + I-B2 (2) | 25 | 280 | 280 | 90 | 3.5 |
| | III-C12: I-A2 (81) + I-B2 (19) | | 280 | | | |
| III-13 | III-C13: PEI (5) + I-A2 (87) + I-B2 (8) | 25 | 280 | 280 | 100 | 3.6 |
| | III-C14: PEI (5) + I-A2 (43) + I-B2 (52) | | 280 | | | |
| III-14 | III-C15: PEI (20) + I-A2 (70) + I-B2 (10) | 25 | 280 | 280 | 100 | 3.6 |
| | III-C16: PEI (20) + I-A2 (25) + I-B2 (55) | | 280 | | | |
| III-15 | III-C17: I-A1 (94) + I-B3 (6) | 60 | 300 | 300 | 130 | 4.5 |
| | III-C18: I-A1 (83) + I-B3 (17) | | 280 | | | |
| III-16 | I-A1 (100) | 60 | 300 | 300 | 130 | 4.5 |
| | III-C19: I-A1 (97) + I-B1 (3) | | 280 | | | |
| III-17 | I-A1 (100) | 60 | 300 | 300 | 120 | 4.5 |
| | III-C20: I-A1 (74) + I-B1 (26) | | 280 | | | |
| III-18 | I-A2 (100) | 60 | 300 | 280 | 90 | 3.5 |
| | III-C21: I-A2 (80) + I-B2 (20) | | 280 | | | |

| | LATERAL STRETCHING | | HEAT SET TREATMENT | |
|---|---|---|---|---|
| EXAMPLES | TEMPERATURE [° C.] | RATIO | TEMPERATURE [° C.] | TIME [SECOND] |
| III-1 | 130 | 5.0 | 210 | 3 |
| III-2 | 130 | 5.0 | 210 | 3 |
| III-3 | 130 | 5.0 | 210 | 3 |
| III-4 | 130 | 4.0 | 210 | 3 |
| III-5 | 120 | 5.0 | 200 | 3 |
| III-6 | 130 | 5.0 | 210 | 3 |
| III-7 | 130 | 5.0 | 210 | 3 |
| III-8 | 130 | 5.0 | 210 | 3 |
| III-9 | 120 | 5.0 | 200 | 3 |
| III-10 | 90 | 4.5 | 210 | 3 |
| III-11 | 90 | 4.5 | 210 | 3 |
| III-12 | 90 | 4.5 | 210 | 3 |
| III-13 | 100 | 4.6 | 210 | 3 |
| III-14 | 100 | 4.8 | 210 | 3 |
| III-15 | 130 | 5.0 | 210 | 3 |
| III-16 | 130 | 5.0 | 210 | 3 |
| III-17 | 120 | 5.0 | 200 | 3 |
| III-18 | 90 | 4.5 | 210 | 3 |

TABLE 6

| | | MOLDING CONDITIONS OF UNSTRETCHED FILM | | | | |
|---|---|---|---|---|---|---|
| COMPARATIVE EXAMPLES | RESIN USED (MASS RATIO) UPPER STAGE: A LAYER LOWER STAGE: B LAYER | COOLING DRUM TEMPERATURE [° C.] | EXTRUSION TEMPERATURE [° C.] UPPER STAGE: A LAYER LOWER STAGE: B LAYER | FEED BLOCK TEMPERATURE [° C.] | LONGITUDINAL STRETCHING | |
| | | | | | TEMPERATURE [° C.] | RATIO |
| III-1 | I-A2 (100) | 25 | 280 | 280 | 100 | 3.5 |
| | I-A2 (100) | | 280 | | | |
| III-2 | I-A1 (100) | 60 | 300 | 300 | 130 | 4.5 |
| | I-A1 (100) | | 300 | | | |

TABLE 6-continued

| | | | | | | |
|---|---|---|---|---|---|---|
| III-3 | I-A1 (100) | 60 | 310 | 290 | 110 | 4.5 |
| | III-C22: I-A1 (41) + I-B1 (59) | | 290 | | | |
| III-4 | III-C23: I-A1 (59) + I-B1 (41) | 60 | 280 | 280 | 110 | 4.5 |
| | III-C23: I-A1 (59) + I-B1 (41) | | 280 | | | |

| COMPARATIVE EXAMPLES | LATERAL STRETCHING | | HEAT SET TREATMENT | |
|---|---|---|---|---|
| | TEMPERATURE [° C.] | RATIO | TEMPERATURE [° C.] | TIME [SECOND] |
| III-1 | 120 | 4.5 | 210 | 3 |
| III-2 | 130 | 5.0 | 210 | 3 |
| III-3 | 110 | 5.0 | 200 | 3 |
| III-4 | 110 | 5.0 | 200 | 3 |

<<Results>>

Table 7 shows the compositions and evaluation results of the biaxially oriented polyester films obtained above. The polyester film of Comparative Example III-3 had a strong curl, which made it difficult to apply a coating material. Because the film elongation during drying was also large, which made it difficult to prepare a magnetic tape, the characteristics were not evaluated. Because the polyester film of Comparative Example III-4 had a large film elongation during drying in the above-mentioned (11) Preparation of magnetic tape, which made it difficult to prepare a magnetic tape, the characteristics were not evaluated.

TABLE 7

| | RESIN | | | | | | | | | | LAMINATED POLYESTER FILM | | | | | | | | | | | | |
|---|---|---|---|---|---|---|---|---|---|---|---|---|---|---|---|---|---|---|---|---|---|---|---|
| | A LAYER | | B LAYER | | | | | THICK-NESS | THICK-NESS RATIO dA/dB | YOUNG'S MODULUS [GPa] | | HU-MIDITY EXPAN-SION COEF-FICIENT [x10-6/% RH] | | TEMPER-ATURE EXPAN-SION COEF-FICIENT [x10-6/°C] | | SURFACE ROUGH-NESS | | CURL [mm] | FILM ELON-GA-TION PER-CENT-AGE [%] | ELEC-TRO-MAG-NETIC CON-VER-SION CHAR-ACTER-ISTICS | ER-ROR RATE | DROP OUT |
| | RESIN TYPE | DIMER ACID | | RESIN TYPE | DIMER ACID | | WAB [mol %] | [μm] | | MD | TD | MD | TD | MD | TD | LAYER A Ra [nm] | LAYER B Ra [nm] | | | | | |
| | | CAR-BON NUM-BER | WA [mol %] | | CAR-BON NUM-BER | WB [mol %] | WB-WA [mol %] | | | | | | | | | | | | | | | |
| EXAMPLE III-1 | PEN | 36 | 0.3 | PEN | 36 | 0.9 | 0.6 | 0.7 | 4.0 | 0.4 | 6.0 | 8.0 | 11.1 | 6.5 | 13.9 | 4.9 | 2.9 | 5.2 | 0.31 | 0.9 | GOOD | GOOD | GOOD |
| EXAMPLE III-2 | PEN | 36 | 0.5 | PEN | 36 | 1.5 | 1.0 | 1.2 | 5.0 | 0.4 | 6.0 | 8.0 | 10.9 | 7.9 | 18.5 | 7.9 | 3.1 | 5.4 | 0.53 | 1.0 | GOOD | VERY GOOD | VERY GOOD |
| EXAMPLE III-3 | PEN | 36 | 0.5 | PEN | 36 | 1.5 | 1.0 | 1.2 | 5.0 | 0.4 | 5.2 | 11.0 | 12.4 | 4.6 | 24.6 | -7.6 | 3.0 | 5.2 | 1.2 | 1.6 | GOOD | GOOD | GOOD |
| EXAMPLE III-4 | PEN | 36 | 0.5 | PEN | 36 | 1.5 | 1.0 | 1.2 | 5.0 | 0.4 | 9.0 | 6.0 | 6.7 | 10.9 | 1.1 | 18.4 | 3.1 | 5.6 | 0.18 | 0.5 | GOOD | GOOD | GOOD |
| EXAMPLE III-5 | PEN | 36 | 1.5 | PEN | 36 | 3.7 | 2.2 | 3.0 | 5.0 | 0.4 | 6.0 | 7.0 | 9.5 | 8.2 | 12.5 | 7.5 | 3.0 | 5.3 | 1.1 | 1.4 | GOOD | GOOD | GOOD |
| EXAMPLE III-6 | PEN | 36 | 0.5 | PEN | 36 | 1.5 | 1.0 | 1.2 | 5.0 | 0.4 | 6.0 | 8.0 | 11.0 | 7.8 | 18.4 | 7.8 | 5.2 | 3.1 | -0.55 | 1.0 | GOOD | VERY GOOD | VERY GOOD |
| EXAMPLE III-7 | PEN | 36 | 0.4 | PEN | 36 | 3.1 | 2.7 | 1.2 | 5.0 | 2.3 | 6.0 | 8.0 | 10.8 | 7.8 | 18.6 | 7.7 | 2.7 | 5.4 | 0.44 | 0.9 | VERY GOOD | VERY GOOD | VERY GOOD |
| EXAMPLE III-8 | PEN | 36 | 0.4 | PEN | 36 | 3.1 | 2.7 | 1.2 | 5.0 | 2.3 | 6.0 | 8.0 | 10.9 | 7.9 | 18.3 | 7.8 | 5.3 | 2.7 | -0.44 | 0.9 | VERY GOOD | VERY GOOD | VERY GOOD |
| EXAMPLE III-9 | PEN | 36 | 0.6 | PEN | 36 | 7.0 | 6.4 | 1.2 | 5.0 | 0.1 | 6.0 | 8.0 | 10.8 | 7.8 | 18.4 | 7.7 | 2.4 | 5.7 | 0.38 | 0.8 | VERY GOOD | VERY GOOD | VERY GOOD |
| EXAMPLE III-10 | PET | 36 | 0.2 | PET | 36 | 1.7 | 1.5 | 1.3 | 5.0 | 0.4 | 5.0 | 6.5 | 11.7 | 7.7 | 20.5 | 12.5 | 2.9 | 5.7 | 0.47 | 1.4 | GOOD | GOOD | GOOD |
| EXAMPLE III-11 | PET | 36 | 0.2 | PET | 36 | 1.7 | 1.5 | 1.3 | 5.0 | 0.4 | 5.0 | 6.5 | 11.6 | 7.7 | 20.4 | 12.6 | 1.3 | 4.9 | 0.46 | 1.4 | GOOD | GOOD | GOOD |
| EXAMPLE III-12 | PET | 36 | 0.2 | PET | 36 | 1.7 | 1.5 | 1.3 | 5.0 | 0.4 | 5.0 | 6.5 | 11.6 | 7.8 | 20.6 | 12.4 | 2.8 | 5.2 | 0.47 | 1.4 | GOOD | GOOD | GOOD |
| EXAMPLE III-13 | PET + PEI | 36 | 0.7 | PET + PEI | 36 | 5.3 | 4.6 | 1.4 | 5.0 | 0.18 | 5.0 | 6.5 | 11.5 | 7.6 | 20.7 | 12.5 | 3.1 | 5.2 | 0.41 | 1.2 | GOOD | GOOD | GOOD |
| EXAMPLE III-14 | PET + PEI | 36 | 1.0 | PET + PEI | 36 | 5.7 | 4.7 | 1.6 | 5.0 | 0.18 | 5.0 | 6.5 | 11.4 | 7.7 | 20.6 | 12.6 | 3.0 | 5.1 | 0.39 | 0.6 | GOOD | GOOD | GOOD |
| EXAMPLE III-15 | PEN | 44 | 0.5 | PEN | 44 | 1.5 | 1.0 | 1.2 | 5.0 | 0.4 | 6.0 | 8.0 | 10.6 | 7.5 | 18.3 | 7.8 | 2.9 | 5.3 | 0.71 | 1.3 | GOOD | VERY GOOD | VERY GOOD |
| EXAMPLE III-16 | PEN | — | — | PEN | 36 | 1.7 | 1.7 | 1.2 | 4.0 | 0.4 | 6.0 | 8.0 | 10.9 | 7.8 | 18.6 | 7.9 | 2.8 | 5.3 | 0.72 | 0.9 | GOOD | VERY GOOD | VERY GOOD |

TABLE 7-continued

| | RESIN | | | | | | | | | | LAMINATED POLYESTER FILM | | | | | | | | | | | |
|---|---|---|---|---|---|---|---|---|---|---|---|---|---|---|---|---|---|---|---|---|---|---|
| | A LAYER | | | B LAYER | | | | | | | | YOUNG'S MODULUS [GPa] | | HUMIDITY EXPANSION COEFFICIENT [×10-6/% RH] | | TEMPERATURE EXPANSION COEFFICIENT [×10-6/°C] | | SURFACE ROUGHNESS | | | | |
| | | DIMER ACID | | | DIMER ACID | | | | | | | | | | | | | A LAYER Ra [nm] | B LAYER Ra [nm] | | FILM ELONGATION PERCENTAGE [%] | ELECTROMAGNETIC CONVERSION CHARACTERISTICS | ERROR RATE | DROP OUT |
| | RESIN TYPE | CARBON NUMBER | WA [mol %] | RESIN TYPE | CARBON NUMBER | WB [mol %] | WB-WA [mol %] | WAB [mol %] | THICKNESS [μm] | THICKNESS RATIO dA/dB | MD | TD | MD | TD | MD | TD | | | CURL [mm] | | | | |
| EXAMPLE III-17 | PEN | — | — | PEN | 36 | 2.4 | 2.4 | 1.7 | 4.0 | 0.4 | 6.0 | 7.0 | 10.6 | 9.0 | 18.5 | 11.7 | 2.8 | 5.5 | 1.1 | 1.2 | GOOD | GOOD | GOOD |
| EXAMPLE III-18 | PET | — | — | PET | 36 | 1.8 | 1.8 | 1.3 | 4.0 | 0.4 | 5.0 | 6.5 | 11.6 | 7.7 | 20.5 | 12.5 | 2.8 | 5.5 | 0.71 | 1.3 | GOOD | GOOD | GOOD |
| COMPARATIVE EXAMPLE III-1 | PET | — | — | PET | — | — | — | — | 5.0 | 0.4 | 5.0 | 6.5 | 12.9 | 8.7 | 21.0 | 13.1 | 3.1 | 5.5 | 0.40 | 1.2 | GOOD | POOR | POOR |
| COMPARATIVE EXAMPLE III-2 | PEN | — | — | PEN | — | — | — | — | 5.0 | 0.4 | 6.0 | 8.0 | 12.0 | 8.9 | 12.4 | 3.4 | 2.9 | 5.4 | -0.3 | 0.8 | GOOD | GOOD | POOR |
| COMPARATIVE EXAMPLE III-3 | PEN | — | — | PEN | 36 | 5.9 | 5.9 | 4.0 | 5.0 | 0.4 | 4.0 | 7.0 | 14.1 | 10.9 | 35.6 | 9.1 | 2.9 | 5.2 | 2.6 | 3.2 | — | — | — |
| COMPARATIVE EXAMPLE III-4 | PEN | 36 | 4.0 | PEN | 36 | 4.0 | 0 | 4.0 | 5.0 | 0.4 | 4.0 | 7.0 | 14.2 | 11.0 | 35.7 | 9.0 | 2.9 | 5.2 | -0.07 | 3.4 | — | — | — |

In Table 7, WAB means the content of aliphatic dimer acid in a whole of the laminated polyester film; WA means the content of aliphatic dimer acid in film layer A; and WB means the content of aliphatic dimer acid in film layer B (WB).

Experiment IV: Laminated Polyester Film Including Layers Having Different Dimer Diol Contents Production Examples <Resin IV-B2>

Transesterification was performed by using dimethyl 2,6-naphthalenedicarboxylate as a dicarboxylate component and ethyleneglycol and Pripol2033 as a diol component in the presence of titanium tetrabutoxide, and the product was continuously polycondensed to obtain a dimer diol-copolymerized polyethylenenaphthalate pellet IV-B2 (IV-0.56 dl/g, Tg=53° C., Tm=245° C.). The content of dimer diol as a diol component was found to be 11.5 mol % by NMR analysis.

<Resin IV-C1>

The pellets II-A1 and II-B1 used in Experiment II were blended at a mass ratio of 96:4 to obtain a resin IV-C1. The composition ratio of dimer diol contained in the resin C1 is 0.3 mol %.

<Resins IV-C2 to C14 and C19 to C23>

Resins IV-C2 to C14 and C19 to C23 were obtained in the same manner as in the resin IV-C1 except that the types and amounts of resins to be used were changed as described in Tables 8 and 9.

<Resins IV-C15 to C18>

"Ultem1010" manufactured by SABIC Innovative Plastics company was prepared as polyetherimide. The polyetherimide and the pellets II-A2 and II-B2 were blended at a mass ratio of 5:84:11 to obtain a resin IV-C15. These blend ratios were changed as shown in Table 8 to obtain resins IV-C16 to C18.

Examples IV-1 to 5, 7, 9, 10, and 16 to 18, and Comparative Examples IV-2 to 4

Biaxially oriented laminated polyester films of Examples IV-1 to 4, 7, and 16 to 18 and Comparative Examples IV-2 to 4 were obtained in the same manner as in Example III-1 except that the molding conditions of resins and films were changed as described in Tables 8 to 10.

Examples IV-6 and 8

In Examples IV-6 and 8, biaxially oriented laminated polyester films were respectively obtained in the same manner as in Examples IV-4 and 7. However, lubricants were changed from Examples III-2 and 7 as follows. When unstretching was provided, 0.12% by mass of spherical silica particles having an average particle size of 0.1 μm and 0.13% by mass of spherical silica particles having an average particle size of 0.3 μm were contained with reference to the mass of a film layer A in the film layer A. 0.08% by mass of spherical silica particles having an average particle size of 0.1 μm were contained with reference to the mass of a film layer B in the film layer B.

Example IV-11

A biaxially oriented laminated polyester film of Example IV-11 was obtained in the same manner as in Example III-1 except that the molding conditions of a resin and film were changed as described in Tables 8 and 10. However, 0.08% by mass of spherical silica particles having an average particle size of 0.1 μm were contained with reference to the mass of a film layer A in the film layer A, and 0.40% by mass of spherical silica particles having an average particle size of 0.1 μm and 0.01% by mass of crosslinked polystyrene particles having an average particle size of 0.2 μm were contained with reference to the mass of a film layer B in the film layer B.

Example IV-12

A biaxially oriented laminated polyester film of Example IV-12 in which coating layers A and B were formed was obtained in the same manner as in Example III-11 except that the molding conditions of a resin and film were changed as described in Tables 8 and 10.

Example IV-13

An unstretched film was obtained in the same manner as in Example IV-11. However, 0.08% by mass of crosslinked polystyrene particles having an average particle size of 0.1 μm were contained with reference to the mass of a film layer A in the film layer A, and 0.40% by mass of crosslinked polystyrene particles having an average particle size of 0.1 μm and 0.01% by mass of crosslinked polystyrene particles having an average particle size of 0.2 μm were contained with reference to the mass of a film layer B in the film layer B. Stretching was performed in the same manner as in Example IV-11 to obtain a biaxially oriented laminated polyester film.

Examples IV-14 and 15

Biaxially oriented polyester films of Examples IV-14 and 15 were obtained in the same manner as in Example III-1 except that the molding conditions of resins and films were changed as described in Tables 8 and 10. However, 0.08% by mass of spherical silica particles having an average particle size of 0.1 μm were contained in a film layer A, and 0.40% by mass of spherical silica particles having an average particle size of 0.1 μm and 0.01% by mass of spherical silica particles having an average particle size of 0.2 μm were contained in a film layer B.

Comparative Example IV-1

A biaxially oriented polyester film of Comparative Example IV-1 was obtained in the same manner as in Example III-1 except that the molding conditions of a resin and film were changed as described in Tables 9 and 10, and a lubricant composition was changed. The lubricant composition was the same as in that of Example IV-13.

TABLE 8

| EXAMPLES | RESIN USED (MASS RATIO) UPPER STAGE: A LAYER LOWER STAGE: B LAYER | MOLDING CONDITIONS OF UNSTRETCHED FILM | | | LONGITUDINAL STRETCHING | |
|---|---|---|---|---|---|---|
| | | COOLING DRUM TEMPERATURE [° C.] | EXTRUSION TEMPERATURE [° C.] UPPER STAGE: A LAYER LOWER STAGE: B LAYER | FEED BLOCK TEMPERATURE [° C.] | TEMPERATURE [° C.] | RATIO |
| IV-1 | IV-C1: II-A1 (96) + II-B1 (4) IV-C2: II-A1 (87) + II-B1 (13) | 60 | 300 280 | 300 | 130 | 4.5 |
| IV-2 | IV-C3: II-A1 (93) + II-B1 (7) IV-C4: II-A1 (79) + II-B1 (21) | 60 | 300 280 | 300 | 130 | 4.5 |
| IV-3 | IV-C3: II-A1 (93) + II-B1 (7) IV-C4: II-A1 (79) + II-B1 (21) | 60 | 300 280 | 300 | 130 | 3.7 |
| IV-4 | IV-C3: II-A1 (93) + II-B1 (7) IV-C4: II-A1 (79) + II-B1 (21) | 60 | 300 280 | 300 | 130 | 4.5 |
| IV-5 | IV-C5: II-A1 (71) + II-B2 (29) IV-C6: II-A1 (50) + II-B2 (50) | 60 | 280 280 | 280 | 120 | 4.5 |
| IV-6 | IV-C3: II-A1 (93) + II-B1 (7) IV-C4: II-A1 (79) + II-B1 (21) | 60 | 300 280 | 300 | 130 | 4.5 |
| IV-7 | IV-C7: II-A1 (94) + II-B1 (6) IV-C8: II-A1 (57) + II-B1 (43) | 60 | 300 280 | 300 | 120 | 4.5 |
| IV-8 | IV-C7: II-A1 (94) + II-B1 (6) IV-C8: II-A1 (57) + II-B1 (43) | 60 | 300 280 | 300 | 130 | 4.5 |
| IV-9 | IV-C9: II-A1 (84) + II-B2 (16) IV-C10: II-A1 (37) + II-B2 (63) | 60 | 280 280 | 280 | 120 | 4.5 |
| IV-10 | IV-C11: II-A1 (91) + II-B1 (9) IV-C12: II-A1 (11) + II-B1 (89) | 60 | 290 280 | 280 | 120 | 4.5 |
| IV-11 | IV-C13: II-A2 (97) + II-B2 (3) IV-C14: II-A2 (76) + II-B2 (24) | 60 | 280 280 | 280 | 90 | 3.5 |
| IV-12 | IV-C13: II-A2 (97) + II-B2 (3) IV-C14: II-A2 (76) + II-B2 (24) | 25 | 280 280 | 280 | 90 | 3.5 |
| IV-13 | IV-C13: II-A2 (97) + II-B2 (3) IV-C14: II-A2 (76) + II-B2 (24) | 25 | 280 280 | 280 | 90 | 3.5 |
| IV-14 | IV-C15: PEI (5) + II-A2 (84) + II-B2 (11) IV-C16: PEI (5) + II-A2 (33) + II-B2 (62) | 25 | 280 280 | 280 | 100 | 3.6 |
| IV-15 | IV-C17: PEI (20) + II-A2 (66) + II-B2 (14) IV-C18: PEI (20) + II-A2 (16) + II-B2 (64) | 25 | 280 280 | 280 | 100 | 3.6 |
| IV-16 | II-A1 (100) IV-C19: II-A1 (76) + II-B1 (24) | 60 | 300 280 | 300 | 120 | 4.5 |
| IV-17 | II-A1 (100) IV-C20: II-A1 (70) + II-B1 (30) | 60 | 300 280 | 300 | 120 | 4.5 |
| IV-18 | II-A2 (100) IV-C21: II-A1 (74) + II-B1 (26) | 25 | 280 280 | 280 | 90 | 3.5 |

| EXAMPLES | LATERAL STRETCHING | | HEAT SET TREATMENT | |
|---|---|---|---|---|
| | TEMPERATURE [° C.] | RATIO | TEMPERATURE [° C.] | TIME [SECOND] |
| IV-1 | 130 | 5.0 | 210 | 3 |
| IV-2 | 130 | 5.0 | 210 | 3 |
| IV-3 | 130 | 5.0 | 210 | 3 |
| IV-4 | 130 | 4.0 | 210 | 3 |
| IV-5 | 130 | 5.0 | 200 | 3 |
| IV-6 | 130 | 5.0 | 210 | 3 |
| IV-7 | 120 | 5.0 | 200 | 3 |
| IV-8 | 130 | 5.0 | 210 | 3 |
| IV-9 | 120 | 5.0 | 200 | 3 |
| IV-10 | 120 | 5.0 | 210 | 3 |
| IV-11 | 90 | 4.5 | 210 | 3 |
| IV-12 | 90 | 4.5 | 210 | 3 |
| IV-13 | 90 | 4.5 | 210 | 3 |
| IV-14 | 100 | 4.6 | 210 | 3 |
| IV-15 | 100 | 4.8 | 210 | 3 |
| IV-16 | 120 | 5.0 | 210 | 3 |
| IV-17 | 120 | 5.0 | 200 | 3 |
| IV-18 | 90 | 4.5 | 210 | 3 |

TABLE 9

| COMPARATIVE EXAMPLES | RESIN USED (MASS RATIO) UPPER STAGE: A LAYER LOWER STAGE: B LAYER | MOLDING CONDITIONS OF UNSTRETCHED FILM | | FEED BLOCK TEMPERATURE [° C.] | LONGITUDINAL STRETCHING | |
|---|---|---|---|---|---|---|
| | | COOLING DRUM TEMPERATURE [° C.] | EXTRUSION TEMPERATURE [° C.] UPPER STAGE: A LAYER LOWER STAGE: B LAYER | | TEMPERATURE [° C.] | RATIO |
| IV-1 | II-A2 (100)<br>II-A2 (100) | 25 | 280<br>280 | 280 | 100 | 3.5 |
| IV-2 | II-A1 (100)<br>II-A1 (100) | 60 | 300<br>300 | 300 | 130 | 4.5 |
| IV-3 | II-A1 (100)<br>IV-C22: II-A1 (74) + IV-B2 (26) | 60 | 310<br>270 | 290 | 110 | 4.5 |
| IV-4 | IV-C23: II-A1 (44) + II-B1 (56)<br>IV-C23: II-A1 (44) + II-B1 (56) | 60 | 280<br>280 | 280 | 110 | 4.5 |

| EXAMPLES | LATERAL STRETCHING | | HEAT SET TREATMENT | |
|---|---|---|---|---|
| | TEMPERATURE [° C.] | RATIO | TEMPERATURE [° C.] | TIME [SECOND] |
| IV-1 | 120 | 4.5 | 210 | 3 |
| IV-2 | 130 | 5.0 | 210 | 3 |
| IV-3 | 110 | 5.0 | 200 | 3 |
| IV-4 | 110 | 4.0 | 200 | 3 |

<<Results>>

Table 10 shows the compositions and evaluation results of the biaxially oriented polyester films obtained above. The polyester film of Comparative Example IV-3 had a strong curl, which made it difficult to apply a coating material. Because the film elongation during drying was also large, which made it difficult to prepare a magnetic tape, the characteristics were not evaluated. Because the polyester film of Comparative Example IV-4 had a large film elongation during drying in the above-mentioned (11) Preparation of magnetic tape, which made it difficult to prepare a magnetic tape, the characteristics were not evaluated.

TABLE 10

| | RESIN | | | | | | | | | | | LAMINATED POLYESTER FILM | | | | | | | | | | | | |
|---|---|---|---|---|---|---|---|---|---|---|---|---|---|---|---|---|---|---|---|---|---|---|---|---|
| | A LAYER | | | B LAYER | | | | | | | | | YOUNG'S MODULUS [GPa] | | HUMIDITY EXPANSION COEFFICIENT [x10-6/ % RH] | | TEMPERATURE EXPANSION COEFFICIENT [x10-6/ °C] | | SURFACE ROUGHNESS | | | | FILM ELONGATION PERCENTAGE [%] | ELECTROMAGNETIC CONVERSION CHARACTERISTICS | ERROR RATE | DROP OUT |
| | | DIMER DIOL | | | DIMER DIOL | | | | | | | | | | | | | | | | | | | |
| | RESIN TYPE | CARBON NUMBER | WA [mol %] | RESIN TYPE | CARBON NUMBER | WB [mol %] | WB-WA [mol %] | WAB [mol %] | THICKNESS [μm] | THICKNESS RATIO dA/dB | | MD | TD | MD | TD | MD | TD | A LAYER Ra [nm] | B LAYER Ra [nm] | CURL [mm] | | | | |
| EXAMPLE IV-1 | PEN | 36 | 0.3 | PEN | 36 | 0.9 | 0.6 | 0.7 | 4.0 | 0.4 | | 6.0 | 8.0 | 11.0 | 8.4 | 12.7 | 3.4 | 2.9 | 5.2 | 0.18 | 0.9 | GOOD | GOOD | GOOD |
| EXAMPLE IV-2 | PEN | 36 | 0.5 | PEN | 36 | 1.5 | 1 | 1.2 | 5.0 | 0.4 | | 6.0 | 8.0 | 10.2 | 7.5 | 13.0 | 3.5 | 3.1 | 5.4 | 0.19 | 1.4 | GOOD | VERY GOOD | VERY GOOD |
| EXAMPLE IV-3 | PEN | 36 | 0.5 | PEN | 36 | 1.5 | 1 | 1.2 | 5.0 | 0.4 | | 5.2 | 11.0 | 11.5 | 4.5 | 17.7 | -7.0 | 3.0 | 5.2 | 0.62 | 1.8 | GOOD | GOOD | GOOD |
| EXAMPLE IV-4 | PEN | 36 | 0.5 | PEN | 36 | 1.5 | 1 | 1.2 | 5.0 | 0.4 | | 9.0 | 6.0 | 6.4 | 10.1 | -0.4 | 12.8 | 3.1 | 5.6 | 0.06 | 0.4 | GOOD | VERY GOOD | VERY GOOD |
| EXAMPLE IV-5 | PEN | 36 | 2.9 | PEN | 36 | 5.2 | 2.3 | 4.5 | 5.0 | 2.3 | | 6.0 | 6.5 | 9.4 | 8.8 | 13.4 | 10.5 | 3.0 | 5.3 | 0.98 | 2.8 | GOOD | GOOD | GOOD |
| EXAMPLE IV-6 | PEN | 36 | 0.5 | PEN | 36 | 1.5 | 1 | 1.2 | 5.0 | 0.4 | | 6.0 | 8.0 | 10.2 | 7.5 | 13.0 | 3.5 | 5.2 | 3.1 | -0.19 | 1.4 | GOOD | VERY GOOD | VERY GOOD |
| EXAMPLE IV-7 | PEN | 36 | 0.4 | PEN | 36 | 3.1 | 2.7 | 1.2 | 5.0 | 2.3 | | 6.0 | 8.0 | 10.1 | 7.4 | 13.1 | 3.6 | 2.8 | 5.4 | 0.14 | 1.0 | VERY GOOD | VERY GOOD | VERY GOOD |
| EXAMPLE IV-8 | PEN | 36 | 0.4 | PEN | 36 | 3.1 | 2.7 | 1.2 | 5.0 | 2.3 | | 6.0 | 8.0 | 10.3 | 7.6 | 12.9 | 3.5 | 5.3 | 2.8 | -0.14 | 1.0 | VERY GOOD | VERY GOOD | VERY GOOD |
| EXAMPLE IV-9 | PEN | 36 | 1.5 | PEN | 36 | 6.7 | 5.2 | 3.0 | 5.0 | 0.4 | | 6.0 | 7.0 | 9.0 | 7.8 | 14.4 | 8.2 | 2.9 | 5.3 | 0.68 | 2.0 | VERY GOOD | VERY GOOD | VERY GOOD |
| EXAMPLE IV-10 | PET | 36 | 0.2 | PET | 36 | 7.0 | 6.4 | 1.2 | 5.0 | 0.1 | | 6.0 | 8.0 | 10.1 | 7.3 | 13.1 | 2.5 | 2.4 | 5.7 | 0.11 | 1.9 | VERY GOOD | GOOD | VERY GOOD |
| EXAMPLE IV-11 | PET | 36 | 0.2 | PET | 36 | 1.7 | 1.5 | 1.2 | 5.0 | 0.4 | | 5.0 | 6.5 | 9.1 | 7.4 | 21.0 | 13.1 | 3.0 | 5.7 | 0.54 | 1.4 | GOOD | GOOD | GOOD |
| EXAMPLE IV-12 | PET | 36 | 0.2 | PET | 36 | 1.7 | 1.5 | 1.2 | 5.0 | 0.4 | | 5.0 | 6.5 | 9.2 | 7.6 | 21.2 | 12.9 | 1.4 | 4.9 | 0.53 | 1.4 | VERY GOOD | GOOD | GOOD |
| EXAMPLE IV-13 | PET | 36 | 0.2 | PET | 36 | 1.7 | 1.5 | 1.2 | 5.0 | 0.4 | | 5.0 | 6.5 | 9.3 | 7.6 | 20.9 | 13.1 | 2.8 | 5.2 | 0.54 | 1.4 | GOOD | GOOD | GOOD |
| EXAMPLE IV-14 | PET + PEI | 36 | 0.7 | PET + PEI | 36 | 4.8 | 4.1 | 1.3 | 5.0 | 5.7 | | 5.0 | 6.5 | 9.1 | 7.6 | 20.9 | 12.8 | 2.4 | 5.2 | 0.41 | 1.3 | GOOD | GOOD | GOOD |
| EXAMPLE IV-15 | PET + PEI | 36 | 1.0 | PET + PEI | 36 | 5.0 | 4.0 | 1.5 | 5.0 | 5.7 | | 5.0 | 6.5 | 9.0 | 7.7 | 21.2 | 13.1 | 2.4 | 5.1 | 0.39 | 0.6 | GOOD | GOOD | GOOD |
| EXAMPLE IV-16 | PEN | — | — | PEN | 36 | 1.7 | 1.7 | 1.2 | 4.0 | 0.4 | | 6.0 | 8.0 | 10.3 | 7.6 | 13.1 | 3.6 | 3.0 | 5.2 | 0.38 | 1.1 | GOOD | VERY GOOD | VERY GOOD |

TABLE 10-continued

| | RESIN | | | | | | | | | | LAMINATED POLYESTER FILM | | | | | | | | | | | |
|---|---|---|---|---|---|---|---|---|---|---|---|---|---|---|---|---|---|---|---|---|---|---|
| | A LAYER | | | B LAYER | | | | | | | | YOUNG'S MODULUS [GPa] | | HUMIDITY EXPANSION COEFFICIENT [×10-6/% RH] | | TEMPERATURE EXPANSION COEFFICIENT [×10-6/° C.] | | SURFACE ROUGHNESS | | | | | |
| | | DIMER DIOL | | | DIMER DIOL | | | | | THICKNESS RATIO dA/dB | | | | | | | | A LAYER Ra [nm] | B LAYER Ra [nm] | CURL [mm] | FILM ELONGATION PERCENTAGE [%] | ELECTROMAGNETIC CONVERSION CHARACTERISTICS | ERROR RATE | DROP OUT |
| | RESIN TYPE | CARBON NUMBER | WA [mol %] | RESIN TYPE | CARBON NUMBER | WB [mol %] | WBWA [mol %] | WAB [mol %] | THICKNESS [μm] | | MD | TD | MD | TD | MD | TD | | | | | | | |
| EXAMPLE IV-17 | PEN | — | — | PEN | 36 | 2.2 | 2.2 | 1.5 | 4.0 | 0.4 | 6.0 | 8.0 | 10.1 | 7.4 | 13.0 | 3.7 | 2.9 | 5.1 | 0.86 | 1.4 | GOOD | VERY GOOD | VERY GOOD |
| EXAMPLE IV-18 | PET | — | — | PET | 36 | 1.8 | 1.8 | 1.2 | 4.0 | 0.4 | 5.0 | 6.5 | 9.1 | 7.5 | 21.0 | 13.2 | 2.8 | 5.5 | 0.26 | 1.3 | GOOD | GOOD | GOOD |
| COMPARATIVE EXAMPLE IV-1 | PET | — | — | PET | — | — | — | 0 | 5.0 | 0.4 | 5.0 | 6.5 | 12.9 | 8.7 | 21.0 | 13.1 | 3.1 | 5.5 | 0.40 | 1.2 | GOOD | POOR | POOR |
| COMPARATIVE EXAMPLE IV-2 | PEN | — | — | PEN | — | — | — | 0 | 5.0 | 0.4 | 6.0 | 8.0 | 12.0 | 8.9 | 12.4 | 3.4 | 2.9 | 5.4 | −0.3 | 0.8 | GOOD | POOR | POOR |
| COMPARATIVE EXAMPLE IV-3 | PEN | — | — | PEN | 36 | 7.9 | 7.9 | 5.3 | 5.0 | 0.4 | 4.0 | 6.5 | 13.0 | 8.4 | 26.5 | 10.4 | 2.9 | 5.2 | 2.2 | 3.6 | — | — | — |
| COMPARATIVE EXAMPLE IV-4 | PEN | 36 | 5.3 | PEN | 36 | 5.3 | 0 | 5.3 | 5.0 | 0.4 | 4.0 | 6.5 | 12.9 | 8.3 | 26.6 | 10.2 | 2.9 | 5.2 | −0.03 | 3.7 | — | — | — |

Examples of aspects of the present invention further include the following aspects:

<<Aspect I-1>>

A polyester composition containing: a copolyester containing an aromatic dicarboxylic acid component having 6 or more carbon atoms as a dicarboxylic acid component; and an alkylene glycol component having 2 to 4 carbon atoms and an aliphatic dimer diol component having 31 to 50 carbon atoms as a glycol component, wherein a content of the dimer diol component with reference to a molar number of the aromatic dicarboxylic acid component is 0.3 to 5.0 mol %.

<<Aspect II-1>>

A polyester composition containing a copolyester of a dicarboxylic acid component represented by the following formulae (I) and (II) and a glycol component represented by the following formula (III), wherein the polyester composition contains 0.5 to 3.5 mol % of dimer acid represented by the following formula (I) with reference to a molar number of a total dicarboxylic acid component constituting the copolyester.

—C(O)—R$^A$—C(O)— (I)

—C(O)—R$^B$—C(O)— (II)

—O—R$^C$—O— (III)

In the above structural formulae (I) to (III), R$^A$ represents an alkylene group which has 31 to 51 carbon atoms, and may contain a cyclic ring and a branched chain; R$^B$ represents a phenyl group or a naphthalenediyl group; and R$^C$ represents an alkylene group having 2 to 6 carbon atoms.

<<Aspect I and II-2>>

The polyester composition according to any one of the above aspects, wherein the polyester composition contains, with reference to a mass of the copolyester, 0.5 to 25% by weight of at least one selected from the group consisting of polyimide, polyetherimide, polyether ketone, and polyether ether ketone in addition to the copolyester.

<<Aspects I and II-3>>

A polyester film including at least one layer containing the polyester composition according to any one of the above aspects.

<<Aspects I and II-4>>

The polyester film according to the above aspect, wherein the polyester film has a Young's modulus of 4.5 GPa or more in at least one direction in a film plane direction.

<<Aspects I and II-5>>

The polyester film according to the above aspect, wherein the polyester film has a film elongation percentage of 3.0% or less at 110° C. in a longitudinal direction.

<<Aspects I and II-6>>

The polyester film according to any of the above aspects, wherein the polyester film has a humidity expansion coefficient of 1 to 8.5 (ppm/RH) in at least one direction in a film plane direction and a temperature expansion coefficient of 14 ppm/° C. or less in at least one direction.

<<Aspects I and II-7>>

The polyester film according to any of the above aspects, wherein the polyester film has at least one surface having a contact angle of water of 75 to 90 degrees.

<<Aspects I and II-8>>

The polyester film according to any one of the above aspects, wherein the polyester film is used for a base film of a magnetic recording medium.

<<Aspects I and II-9>>

A magnetic recording medium including: the polyester film according to the above aspect; and a magnetic layer formed on one surface thereof.

<<Aspect III-1>>

A laminated polyester film comprising a film layer A and a film layer B comprising a polyester containing an aromatic dicarboxylic acid component and alkylene glycol having 2 to 6 carbon atoms as a main resin component, and the film layer B is laminated over the film layer A, wherein: at least the polyester forming the film layer B is obtained by copolymerizing an aliphatic dimer diol component having 31 to 50 carbon atoms; and a content ($W_{AB}$) of the dimer diol in a whole of the laminated polyester film with reference to a molar number of a total dicarboxylic acid component is 0.5 to 5.0 mol %; and a content ($W_B$) of the aliphatic dimer diol in the film layer B is more than a content ($W_A$) of the aliphatic dimer diol in the film layer A by 0.3 mol % or more.

<<Aspect III-2>>

The laminated polyester film according to the above aspect, wherein the content ($W_B$) of the dimer diol in the film layer B is 0.6 to 8.0 mol %.

<<Aspect III-3>>

The laminated polyester film according to the above aspect, wherein the content ($W_A$) of the dimer diol in the film layer A is 0 to 3.0 mol %.

<<Aspect III-6>>

The laminated polyester film according to any of the above aspects, wherein: a thickness ratio (dA/dB) of a thickness (dA) of the film layer A to a thickness (dB) of the film layer B is 0.7 or less; and a difference between the content ($W_B$) of the dimer diol in the film layer B and the content ($W_A$) of the dimer diol in the film layer A is 0.3 to 2.5 mol %.

<<Aspect III-7>>

The laminated polyester film according to any of the above aspects, wherein: a thickness ratio (dA/dB) of a thickness (dA) of the film layer A to a thickness (dB) of the film layer B is 2.0 or more; and a difference between the content ($W_B$) of the dimer diol in the film layer B and the content ($W_A$) of the dimer diol in the film layer A is 2.5 to 7.0 mol %.

<<Aspect IV-1>>

A laminated polyester film comprising a film layer A and a film layer B comprising polyester containing an aromatic dicarboxylic acid component and alkylene glycol having 2 to 6 carbon atoms as a main resin component, and the film layer B is laminated over the film layer A, wherein: at least the polyester forming the film layer B is obtained by copolymerizing aliphatic dimer acid having 31 to 51 carbon atoms;

a content ($W_{AB}$) of the aliphatic dimer acid in a whole of the laminated polyester film with reference to a molar number of a total dicarboxylic acid component is 0.5 to 3.5 mol %; and a content ($W_B$) of the aliphatic dimer acid in the film layer B is more than a content ($W_A$) of the aliphatic dimer acid in the film layer A by 0.3 mol % or more.

<<Aspect IV-2>>

The laminated polyester film according to the above aspect, wherein the content ($W_B$) of the aliphatic dimer acid in the film layer B is 0.6 to 8.0 mol %.

<<Aspect IV-3>>

The laminated polyester film according to the above aspect, wherein the content ($W_A$) of the aliphatic dimer acid in the film layer A is 0 to 3.0 mol %.

<<Aspect IV-6>>

The laminated polyester film according to any of the above aspects, wherein a thickness ratio (dA/dB) of a thickness (dA) of the film layer A to a thickness (dB) of the film layer B is 0.7 or less, and a difference between the content ($W_B$) of the aliphatic dimer acid in the film layer B and the content ($W_A$) of the aliphatic dimer acid in the film layer A is 0.3 to 2.5 mol %.

<<Aspect IV-7>>

The laminated polyester film according to any of the above aspects, wherein: a thickness ratio (dA/dB) of a thickness (dA) of the film layer A to a thickness (dB) of the film layer B is 2.0 or more; and a difference between the content ($W_B$) of the aliphatic dimer acid in the film layer B and the content ($W_A$) of the aliphatic dimer acid in the film layer A is 2.5 to 7.0 mol %.

<<Aspects III and IV-4>>

The laminated polyester film according to any of the above aspects, wherein a difference between surface roughness (RaA) of the film layer A and surface roughness (RaB) of the film layer B is 1.0 nm or more.

<<Aspects III and IV-5>>

The laminated polyester film according to any one of the above aspects, wherein at least one film layer of the film layers A and B contains, with reference to the mass of the film layer, 0.5 to 25% by mass of at least one selected from the group consisting of polyimide, polyetherimide, polyether ketone, and polyether ether ketone in addition to the copolyester.

<<Aspects III and IV-10>>

The laminated polyester film according to any of the above aspects, wherein the laminated polyester film has a film elongation of 3.0% or less at 110° C. in a longitudinal direction of the film.

<<Aspects III and IV-11>>

The laminated polyester film according to any one of the above aspects, wherein the laminated polyester film is used for a base film of a magnetic recording medium.

<<Aspects III and IV-12>>

A magnetic recording medium including: the laminated polyester film according to any one of the above aspects; and a magnetic layer formed on one surface of the laminated polyester film.

The invention claimed is:

1. A copolyester comprising:
   (A) an aromatic dicarboxylic acid component;
   (B) an alkylene glycol component; and
   (C1) a dimer acid component and/or (C2) a dimer diol component,
   wherein the copolyester contains, with reference to a molar number of a total dicarboxylic acid component, 0.5 to 3.5 mol % of the dimer acid component (C1) and/or 0.3 to 4.0 mol % of the dimer diol component (C2), and wherein the dimer acid component (C1) and/or the dimer diol component (C2) has an average carbon number of at least 20.

2. The copolyester according to claim 1, wherein the dimer acid component (C1) and/or the dimer diol component (C2) are/is derived from a mixture of an aliphatic dicarboxylic acid component and/or aliphatic diol component having an average carbon number of 20 to 55.

3. The copolyester according to claim 1, comprising repeating units (I) to (III):

wherein the repeating unit (I) is the dimer acid component (C1), and $R^A$ is an alkylene group which has 31 to 51 carbon atoms, and may contain a cyclo ring and/or a branched chain,
the repeating unit (II) is the aromatic dicarboxylic acid component (A), and $R^B$ is a phenylene group or a naphthalenediyl group, and
the repeating unit (III) is the alkylene glycol component (B), and $R^C$ is an alkylene group having 2 to 6 carbon atoms.

4. The copolyester according to claim 1, wherein
the copolyester contains, with reference to a molar number of the aromatic dicarboxylic acid component, 0.3 to 4.0 mol % of the dimer diol component (C2),
the aromatic dicarboxylic acid component (A) is aromatic dicarboxylic acid having 6 or more carbon atoms,
the alkylene glycol component (B) is alkylene glycol having 2 to 4 carbon atoms, and
the dimer diol component (C2) is aliphatic dimer diol having 31 to 50 carbon atoms.

5. The copolyester according to claim 1, wherein
the copolyester comprises the dimer diol component (C2), and
the dimer diol component (C2) comprises a branched chain and/or a cyclohexane ring structure.

6. A polyester film comprising the copolyester according to claim 1.

7. The polyester film according to claim 6, wherein the polyester film has a temperature expansion coefficient of 14 ppm/° C. or less in at least one direction in the plane direction of the polyester film.

8. The polyester film according to claim 6, wherein the polyester film has a humidity expansion coefficient of 1 to 8.5 ppm/% RH in at least one direction in the plane direction of the polyester film.

9. A laminated polyester film comprising:
a film layer A which comprises a polyester film; and
a film layer B which comprises a polyester film and is laminated over the film layer A,
wherein at least one of the film layer A and the film layer B is the polyester film according to claim 6.

10. The laminated polyester film according to claim 9, wherein a content ($W_{AB}$) of the dimer acid component (C1) is within a range of 0.5 to 3.5 mol % or a content ($W_{AB}$) of the dimer diol component (C2) is within a range of 0.5 to 5.0 mol %, with reference to a molar number of a total dicarboxylic acid component in a whole of the laminated polyester film.

11. The laminated polyester film according to claim 9, wherein a difference between a content ($W_A$) of the dimer acid with reference to a molar number of a total dicarboxylic acid component in the film layer A and a content ($W_B$) of the dimer acid with reference to a molar number of a total dicarboxylic acid component in the film layer B is 0.3 mol % or more.

12. The laminated polyester film according to claim 9, wherein a difference between a content ($W_A$) of the dimer diol with reference to a molar number of a total dicarboxylic acid component in the film layer A and a content ($W_B$) of the dimer diol with reference to a molar number of a total dicarboxylic acid component in the film layer B is 0.3 mol % or more.

13. The laminated polyester film according to claim 9, wherein a difference between surface roughness ($Ra_A$) of the film layer A and surface roughness ($Ra_B$) of the film layer B is 1.0 nm or more.

14. The laminated polyester film according to claim 9, wherein at least one film layer of the film layers A and B contains, with reference to a mass of the film layer, 0.5 to 25% by mass of at least one selected from the group consisting of polyimide, polyether imide, polyether ketone, polyether ether ketone, and a mixture thereof in addition to the copolyester.

15. The laminated polyester film according to claim 9, wherein the laminated polyester film is used for a base film of a magnetic recording medium.

16. A magnetic recording medium comprising:
   the laminated polyester film according to claim 9; and
   a magnetic layer formed on one surface of the laminated polyester film.

17. The laminated polyester film according to claim 9, wherein a ratio (dA/dB) of a thickness (dA) of the film layer A and a thickness (dB) of the film layer B is 0.03 to 33.

18. The laminated polyester film according to claim 9, wherein the laminated polyester film has a temperature expansion coefficient of 14 ppm/° C. or less in at least one direction in the plane direction of the laminated polyester film.

19. The laminated polyester film according to claim 9, wherein the laminated polyester film has a humidity expansion coefficient of 1 to 8.5 ppm/% RH in at least one direction in the plane direction of the laminated polyester film.

* * * * *